US008415012B2

(12) United States Patent
Zheng et al.

(10) Patent No.: US 8,415,012 B2
(45) Date of Patent: Apr. 9, 2013

(54) CARBON NANOTUBE AND NANOFIBER FILM-BASED MEMBRANE ELECTRODE ASSEMBLIES

(75) Inventors: Jian-ping Zheng, Tallahassee, FL (US); Zhiyong Liang, Tallahassee, FL (US); Ben Wang, Tallahassee, FL (US); Chun Zhang, Tallahassee, FL (US); Wei Zhu, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 781 days.

(21) Appl. No.: 12/505,070

(22) Filed: Jul. 17, 2009

(65) Prior Publication Data

US 2010/0143822 A1    Jun. 10, 2010

Related U.S. Application Data

(63) Continuation-in-part of application No. 11/670,687, filed on Feb. 2, 2007, now Pat. No. 7,955,535.

(60) Provisional application No. 61/081,851, filed on Jul. 18, 2008, provisional application No. 60/764,504, filed on Feb. 2, 2006.

(51) Int. Cl.
*H01M 8/10* (2006.01)
*H01M 4/88* (2006.01)

(52) U.S. Cl. ........ 428/408; 429/480; 429/483; 429/523; 429/524; 429/534; 977/742; 977/750; 977/752; 977/773; 502/101; 427/115

(58) Field of Classification Search .................. 428/408, 428/292.1, 299.1, 221, 297.4, 212, 323; 429/483, 429/523–524, 534, 479–482; 502/101; 977/742, 977/750–752, 773, 734–735; 423/445 R, 423/447.1, 445 B, 447.2, 447.3
See application file for complete search history.

(56) References Cited

U.S. PATENT DOCUMENTS

| | | | |
|---|---|---|---|
| 6,036,857 A | 3/2000 | Chen et al. | |
| 6,287,717 B1 | 9/2001 | Cavalca | |
| 7,459,121 B2 | 12/2008 | Liang et al. | |
| 2002/0150524 A1 | 10/2002 | Smalley et al. | |
| 2003/0118907 A1 | 6/2003 | Shiraishi | |
| 2004/0197638 A1* | 10/2004 | McElrath et al. | 429/44 |
| 2005/0239948 A1 | 10/2005 | Haik et al. | |
| 2006/0017191 A1 | 1/2006 | Liang et al. | |
| 2006/0207931 A1 | 9/2006 | Liang et al. | |
| 2006/0247364 A1* | 11/2006 | Murray et al. | 524/495 |
| 2008/0020261 A1 | 1/2008 | Hendricks | |
| 2009/0053577 A1 | 2/2009 | Aotani | |
| 2011/0008705 A1 | 1/2011 | Zheng | |

OTHER PUBLICATIONS

Gasteiger et al., "Activity benchmarks and requirements for Pt, Pt-alloy, and non-Pt oxygen reduction catalysts for PEMFCs", Nov. 5, 2004, Elsevier, Applied Catalysis B: Environmental 56 (2005), 9-35.*

(Continued)

*Primary Examiner* — Jennifer McNeil
*Assistant Examiner* — Nicholas W Jordan
(74) *Attorney, Agent, or Firm* — Novak Druce Connolly Bove + Quigg LLP

(57) ABSTRACT

A membrane electrode assembly (MEA) for a fuel cell comprising a catalyst layer and a method of making the same. The catalyst layer can include a plurality of catalyst nanoparticles, e.g., platinum, disposed on buckypaper. The catalyst layer can have 1% or less binder prior to attachment to the membrane electrode assembly. The catalyst layer can include (a) single-wall nanotubes, small diameter multi-wall nanotubes, or both, and (b) large diameter multi-wall nanotubes, carbon nanofibers, or both. The ratio of (a) to (b) can range from 1:2 to 1:20. The catalyst layer can produce a surface area utilization efficiency of at least 60% and the platinum utilization efficiency can be 0.50 $g_{Pt}$/kW or less.

14 Claims, 16 Drawing Sheets

OTHER PUBLICATIONS

Ku, Chung-Lin, "Nanotube Buckypaper Electrodes forPEM Fuel Cell Applications" (2007). Electronic Theses, Treatises and Dissertations. Paper 2959, <http://diginole.lib.fsu.edu/etd/2959>.*

Li et al., "Carbon Nanotube Film by Filtration as Cathode Catalyst Support for Proton-Exchange Membrane Fuel Cell", Sep. 8, 2005, Langmuir 2005, 21, 9386-9389.*

Zhang et al., "Electrostatic Layer-by-Layer Assembled Carbon Nanotube Mutilayer Film and Its Electrocatalytic Activity for O2 Reduction", Sep. 1, 2004, Langmuir 2004, 20, 8781-8785.*

Ramesh et al., "SWNT-MWNT Hybrid Architecture for Proton Exchange Membrane Fuel Cell Cathodes", May 28, 2008, J. Phys. Chem. C 2008, 112, 9089-9094.*

Tang et al., "Carbon Nanotube Free-Standing Membrane of Pt/SWNTs as Catalyst Layer in Hydrogen Fuel Cells", Jul. 9, 2007, Aust. J. Chem. 2007, 60, 528-532.*

Kongkanand et al., "Highly Dispersed Pt Catalysts on Single-Walled Carbon Nanotubes and Their Role in Methanol Oxidation", Aug. 3, 2006, J. Phys. Chem B, 2006, vol. 110, No. 33, 16185-16188.*

Cheng et al., "Power Densities Using Different Cathode Catalysts (Pt and CoTMPP) and Polymer Binders (Nafion and PTFE) in Single Chamber Microbial Fuel Cells", Nov. 23, 2005, Environ. Sci. Technol., 2006, vol. 40, No. 1, 364-369.*

Saha et al. "High loading and monodispersed Pt nanoparticles on multiwalled carbon nanotubes for high performance proton exchange membrane fuel cells." Available Online Nov. 21, 2007. Elsevier. Journal of Power Sources. 177 (2008). pp. 314-322.*

Hou and Reneker "Carbon Nanotubes on Carbon Nanofibers: A Novel Structure Based on Electrospun Polymer Nanofibers." Jan. 5, 2004. Advanced Materials. 2004, 16. No. 1, pp. 69-73.*

Bordjiba et al. "Binderless carbon nanotube/carbon fibre composites for electrochemical micropower sources." Jan. 3, 2007. Institute of Physics Publishing. Nanotechnology. 18 (2007). 035202. pp. 1-5.*

Michel et al. "High-Performance Nanostructured Membrane Electrode Assemblies for Fuel Cells Made by Layer-by-Layer Assembly of Carbon Nanocolloids." Nov. 19, 2007. Advanced Materials. 2007, 19. pp. 3859-3864.*

Wood et al. (2001) Orientation of Carbon Nanotubes in Polymers and its Detection by Raman Spectroscopy, Composites: Part A, 32: 391-399.

Ajayan et al. (Aug. 26, 1994) Aligned Carbon Nanotube Arrays Formed by Cutting a Polymer Resin-Nanotube Composite, Science, 265: 212-1214.

Ajayan et al. (2000) Single-Walled Carbon Nanotube-Polymer Composites: Strength and Weakness, Advanced Materials, 12: 750-753.

Andrews et al. (Aug. 30, 1999) Nanotube composite carbon fibers, Applied Physics Letters, 75(9): 1329-1331.

Athalin, H. (Apr. 1, 2005) A correlated method for quantifying mixed and dispersed carbon nanotubes: analysis of the Raman band intensities and evidence of wavenumber shift, Journal of Raman Spectroscopy, 36: 400-408.

Chauvet et al. (Sep. 1, 1995) Magnetic anisotropies of aligned carbon nanotubes, The American Physical Society, 52(10): 6963-6966.

Chen et al. (Jun. 20, 2001) Electrochemical synthesis of polypyrrole/carbon nanotube nanoscale composites using well-aligned carbon nanotube arrays, Applied Physics A, 73: 129-131.

Cooper et al. (2002) Distribution and Alignment of Carbon Nanotubes and Nanofibrils in a Polymer Matrix, Composites Science and Technology, 62: 1105-1112.

Dai (Mar. 10, 2002) Carbon Nanotubes Opportunities and Challenges, Surface Science 500: 218-241.

de Heer et al. (May 12, 1995) Aligned Carbon Nanotube Films: Production and Optical and Electronic Properties, Science, 268: 845-847.

Dresselhaus et al. (1988) Graphite Fiber and Filament, M. Cardon, Ed., 12-34.

Smith et al. (Jul. 31, 2000) Structural anisotrophy of magnetically aligned single wall carbon nanotube films, Applied Physics Letters, 77(5): 663-665.

Stephan, et al. (Jan. 17, 2000) Characterization of singlewalled carbon nanotubes-PMMA composites, Synthetic Metals, 108(2): 139-149. Abstract.

Thostenson et al. (Dec. 10, 2004) Nanocomposites in context, Composites Science and Technology, 65: 491-516.

Treacy, et al. (Jun. 20, 1996) Exceptionally High Young's Modulus Observed for Individual Carbon Nanotubes, Nature, 381: 678-680.

Velasco-Santos et al. (Jul. 3, 2002) Chemical functionalization of carbon nanotubes through an organosilane, Nanotechnology, 13: 495-498. Abstract.

Velasco-Santos et al. (Aug. 2002) Chemical functionalization of carbon nanotubes through an organosilane, Nanotechnology, 13: 495-498.

Vohrer, U. (Feb. 6, 2004) Carbon nanotube sheets for the use as artificial muscles, Carbon, 42: 1159-1164.

Wang et al. (Apr. 19, 1993) Growth and characterization of buckybundles, Applied Physics Letters, 62(16): 1881-1883.

Wang et al. (Jul. 14-18, 2003) Fabrication and Characterization of In-Plane Aligned Nanotube Composites with Magnetically Aligned Carbon Nanotube Bucky Papers, Proc. 14th Int. Conf. on Composite Materials (ICCM-14), 1, San Diego, CA: 1-7.

Knez et al. (2002) Electrochemical modification of individual nanoobjects, Journal of Electroanalytical Chemistry, 522: 70-74.

Kumar et al. (2002) Fibers from Polypropylene/Nano Carbon Fiber Composites, Polymer 43: 1701-1703.

Kyotani et al. (1996) Preparation of Ultrafine Carbon Tubes in Nanochannels of an Anodic Aluminum Oxide Film, Chem. Mater. 8: 2109-2113.

Li et al. (Dec. 6, 1996) Large-Scale Synthesis of Aligned Carbon Nanotubes, Science, 274: 1701-1703.

Liang et al. (May 16-24, 2004) Molecular Dynamic Simulation and Experimental Investigation of Filling Chopped SWNTS with Resin Matrix Molecules to Enhance Interfacial Bonding and Loading Transfer in Nanocomposites, SAMPE 2004, Long Beach, CA: 1-8.

Lourie et al. (Sep. 1998) Evaluation of Young's modulus of carbon nanotubes by micro-Raman spectroscopy, Journal of Materials Research, 13(9): 2418-2422.

Ni et al. (Jun. 15, 2000) Chemical Functionalization of Carbon Nanotubes through Energetic Radical Collisions, Physical Review B., 61: R16343-R16346.

Qian et al. (May 15, 2000) Load transfer and deformation mechanisms in carbon nanotube-polystyrene composites, Applied Physics Letters, 76(20): 2868-2870.

U.S. Appl. No. 11/459,171, filed Jul. 21, 2006, Wang et al.

Endo et al. (Feb. 3, 2005) Buckypaper from Coaxial Nanotubes, Nature, 433 (3): 476.

Fan et al. (Jan. 22, 1999) Self-Oriented Regular Arrays of Carbon Nanotubes and Their Field Emission Properties, Science, 283: 512-514.

Fujiwara et al. (May 10, 2001) Magnetic Orientation and Magnetic Properties of a Single Carbon Nanotube, The Journal of Physical Chemistry, 105(18): 4383-4386.

Garg et al. (Oct. 16, 1998) Effect of chemical functionalization on the mechanical properties of carbon nanotubes, Chemical Physics Letters, 295(4): 273-278.

Gou et al. (Sep. 11-13, 2002) Development of Nanotube Bucky Paper/Epoxy Nanocomposites, Proceedings of the TEXCOMP-6 International Symposium on Textile Composites: 1-5.

Gou et al. (May 12-14, 2003) Process Analysis and optimization of SWNT Bucky Paper Reinforce Epoxy Composites, Proceedings of the 48th International Society for Advancement of Material Process Engineering (SAMPE) Symposium and Exhibition, Long Beach, CA: 1-12.

Gou et al. (2004) Experimental Design and Optimization of Dispersion Process for Single-Walled Carbon Nanotube Bucky Paper, International Journal of Nanoscience, 3(3): 293-307.

Hertel et al. (Nov. 15, 1998) Deformation of Carbon Nanotubes by Surface van der Waals Forces, Physical Review B., 58: 13870-13873.

Holloway et al. (Apr. 1993) Texture Development Due to Preferential Gain Growth of Ho-Ba-Cu-O in 1.6-T Magnetic Field, J. Mat. Res. 8: 727-733.

Iijima, S. (1991) Helical microtubules of graphitic carbon, Nature, 354: 56-58.

International Search Report and Written Opinion dated Jan. 28, 2011 for International Application No. PCT/US2010/042451, International Filing Date Jul. 19, 2010 consisting of 6 pages.

* cited by examiner (a)

(b)

(a)

(b)

CARBON NANOTUBE AND NANOFIBER FILM-BASED MEMBRANE ELECTRODE ASSEMBLIES

CROSS-REFERENCE TO RELATED APPLICATIONS

This application claims priority to U.S. Patent Application No. 61/081,851, filed Jul. 18, 2008, entitled "Carbon Nanotube and Nanofiber Film-Based Membrane Electrode Assemblies," and is a continuation-in-part of U.S. patent application Ser. No. 11/670,687, filed Feb. 2, 2007, which claims priority to U.S. Patent Application No. 60/765,504, filed Feb. 2, 2006, the entirety of each is incorporated herein by reference.

FIELD OF THE INVENTION

The present invention is related to the field of membrane electrode assemblies for proton exchange membrane fuel cells.

BACKGROUND OF THE INVENTION

Fuel cells are regarded by many as a promising source of power for a wide array of devices, including vehicles, as well as a host of other portable and stationary applications. Fuel cells are capable of providing high energy efficiency and relatively rapid start-up. Moreover, fuel cells are capable of generating power without generating the types of environmental pollution that characterize many other sources of power. Thus, fuel cells can be a key to meeting critical energy needs while also mitigating environmental pollution by substituting for conventional power sources.

Notwithstanding the advantages afforded by increased utilization of fuel cells, their wide-spread commercialization is likely to hinge on whether and the extent to which the cost per unit power associated with fuel cells can be reduced. One promising approach to achieving such cost reduction is to reduce the amount of platinum (Pt) that is required for constructing the electrodes of a fuel cell. Indeed, a particularly promising avenue for commercialization is to improve Pt utilization while also optimizing electrode structure so as to achieve a high Pt-specific power density.

One obstacle to achieving this aim, however, is the fact that conventional catalyst supporting materials, such as carbon black Vulcan XC-72R, have numerous micropores in which Pt nanoparticles can become trapped. This typically results in a failure in establishing the three-phase boundary (TPB) among gas, electrolytes, and the electrocatalyst of a fuel cell. The corresponding fraction of Pt is therefore not utilized since the electrochemical reactions can not occur at these sites, thus causing a reduction in the level of Pt utilization. Moreover, carbon black can be corroded under the severe conditions inherent in the cathode of the fuel cell, resulting in low cell stability and reduced service life.

More recently, carbon nanotubes and nanofibers have been examined as possible catalyst supports in polymer exchange membrane fuel cells (PEMFCs) because carbon nanomaterials typically exhibit high conductivity and large specific surface areas. Additionally, such carbon nanomaterials possess relatively low microporosity and typically exhibit excellent resistance to electrochemical corrosion.

A conventional processes for fabricating carbon nanotube-based and carbon nanofiber-based catalyst layers for use in a PEMFC is to disperse carbon nanotubes (CNTs) and carbon nanofibers (CNFs) in a binder, such as Teflon or Nafion, to form a slurry that is then used to coat the gas diffusion layer. A significant problem inherent in the conventional process, however, is that the addition of the binder tends to isolate carbon nanotubes in the electrocatalyst layer, generally leading to poor electron transport and degradation or elimination of the Pt active surface.

SUMMARY OF THE INVENTION

In view of the foregoing background, it is therefore a feature of the present invention to provide a carbon-materials-based membrane electrode assembly (MEA) for a fuel cell that overcomes the limitations discussed above. According to one aspect of the invention, the MEA comprises a porous buckypaper film with catalyst nanoparticles disposed on or near the surface. The buckypaper-nanoparticle catalyst composite is applied as a catalyst layer of the MEA.

A particular feature of the MEA, according to the invention, is that the buckypaper (BP) film is fabricated with carbon nanotubes, nanofibers, or a mixture thereof, with little or no binder. The buckypaper additionally can be treated with high temperature for improving electrical and/or mechanical properties of the structure. The microstructure of the buckypaper can be tailored by adjusting the starting materials and nanotubes dispersion so as to achieve a desired porosity, pore size, surface area, and electrical conductivity for use as the catalyst layer of the MEA. The catalyst nanoparticles are preferably deposited directly at the most efficient sites of the buckypaper to thereby maximize the three-phase reaction coefficient. The MEA so fabricated can have a higher catalyst utilization rate at the electrodes, can provide higher power output, and can have enhanced oxidation resistance, and well as a longer service life, as compared to conventionally-fabricated fuel cells.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

The present invention is directed to a newly-designed membrane electrode assembly (MEA) for a fuel cell, as well as a method for fabricating the same. An important aspect of the invention, as described herein is the utilization of carbon nanomaterial buckypaper, the buckypaper being fabricated with little or no binders.

Figure 1:
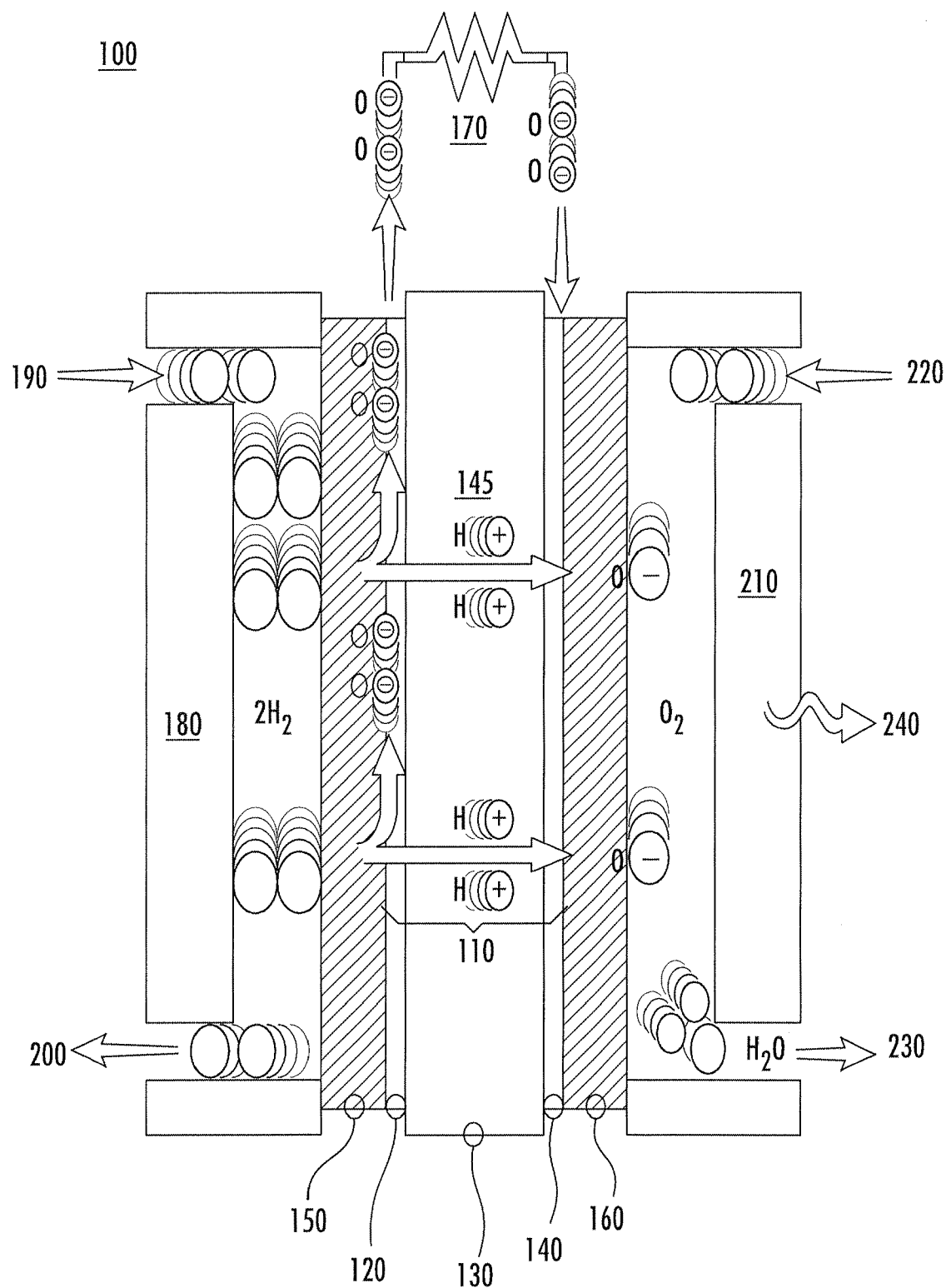
FIG. 1 is a schematic of an exemplary proton exchange membrane fuel cell, including a membrane electrode assembly.

FIG. 1 shows an exemplary proton exchange membrane fuel cell (PEMFC) 100 for use in connection with the membrane electrode assembly disclosed herein. The MEA 110 can include an anode catalyst 120, a proton exchange membrane 130 and a cathode catalyst 140. The proton exchange membrane 130 serves as an electrical insulator separating the anode catalyst layer 120 from the cathode catalyst layer 140, while also being permeable to protons 145. In addition, the MEA 110 can include an anode gas diffusion layer 150 and a cathode gas diffusion layer 160. The anode catalyst layer 120 and cathode catalyst layer 140 can be electrically connected 170 enabling electrons to flow from the anode to the cathode.

The anode side 180 of the PEMFC 100 is designed to bring a fuel gas 190, such as hydrogen ($H_2$), into contact with the anode catalyst layer 120. The used fuel 200 is then removed from the anode side 180. The cathode side 210 of the PEMFC 100 is designed to bring an oxidant 220, such as oxygen ($O_2$) from air, into contact with the cathode catalyst layer 140. The oxidation of the oxygen on the cathode side 210 produces water and generates heat. The mixture of air and water 230 flows out of the cathode side 210, while the excess heat 240 can be removed using water or cooled air. It will be understood that while an exemplary PEMFC has been disclosed, there are other designs for PEMFCs with which the MEA disclosed herein can be used.

The membrane electrode assembly (MEA) for a fuel cell can include a catalyst layer comprising a plurality of catalyst nanoparticles disposed on buckypaper. The catalyst layer can include 1 wt-% or less binder based on the total weight of the catalyst layer following deposition of the catalyst nanoparticles. The catalyst layer can include 0.5 wt-% or less binder, or 0.25 wt-% or less binder, or 0.1 wt-% or less binder, or 0.05 wt-% or less binder, or the catalyst layer can include no binder following deposition of the catalyst nanoparticles.

As used herein, "binder" is used to refer to compounds and compositions used to create adherence between the nanofilaments forming the buckypaper that are added during the formation of the buckypaper. Exemplary binders include perfluorinated polymers, such as those sold by E. I. Du Pont De Nemours and Company under the TEFLON mark, and perfluorinated, sulfonic acid resins, such as those sold by E. I. Du Pont De Nemours and Company under the NAFION mark.

As used herein, "buckypaper" is used to refer to a film-like, stable composite comprising a web of single-wall carbon nanotubes, multi-wall carbon nanotubes, carbon nanofibers, or a combination thereof. In the embodiments disclosed herein, the buckypaper can be stabilized largely by entanglement of flexible single-wall nanotubes and small diameter multi-wall nanotubes around larger, more rigid nanofibers and the large diameter multi-wall nanotubes.

As used herein, the terms "carbon nanotube" and the shorthand "nanotube" refer to carbon fullerene structures having a generally cylindrical shape and typically having a molecular weight ranging from about 840 to greater than 10 million Daltons. Carbon nanotubes are commercially available, for example, from Carbon Nanotechnologies, Inc. (Houston, Tex. USA), or can be made using techniques known in the art. As used herein, the term "small diameter MWNT" refers to multiwall nanotubes having a diameter of 10 nm or less, and the term "large diameter MWNT" refers to multiwall nanotubes having a diameter of more than 10 nm. The term "large diameter CNF" refers to carbon nanofibers having a diameter of 10 nm or more. As used herein, the terms "carbon nanofilament" and "nanofilament" are used interchangeably to describe single-wall carbon nanotubes, multi-wall carbon nanotubes and carbon nanofibers.

Single-wall nanotubes can have a diameter of less than 5 nanometers and a length between 100-1000 nanometers. Multi-wall nanotubes are multi-wall nanotube structures and can have a diameter ranging from less than 10 nanometers to 100 nanometers and a length between 500 nanometers and 500 micrometers. Carbon nanofibers can have a diameter from 100 nanometers to 200 nanometers and a length from 30 to 100 micrometers.

The buckypaper can include at least two types of nanofilaments selected from single-wall nanotubes, small diameter multi-wall carbon nanotubes, large diameter multi-wall carbon nanotubes, and carbon nanofibers. The buckypaper used in the catalyst layer can include (a) single-wall nanotubes, small diameter multi-wall nanotubes, or both, and (b) large diameter multi-wall nanotubes, carbon nanofibers, or both.

The ratio of the nanofilaments of (a) to the nanofilaments of (b) can range from 1:2 to 1:20. In some embodiments, the ratio of (a) to (b) can range from 1:2 to 1:15, or 1:2.25 to 1:8, or from 1:2.5 to 1:6.

The buckypaper can include at least a first layer and a second layer. The first and second layers can be the same or different. The first layer can include (a) single-wall nanotubes, small diameter multi-wall nanotubes, or both, and (b) large diameter multi-wall nanotubes, carbon nanofibers, or both, and the second layer can include multi-wall nanotubes, carbon nanofibers, or both.

The buckypaper microstructure can be tailored by adjusting the starting materials and nanotube dispersion to achieve a target porosity, pore size, surface area and electrical conductivity. The catalyst layer can be formed by depositing a plurality of catalyst nanoparticles on the buckypaper after the buckypaper has been formed. The buckypaper can be formed using less than 1 wt-% binder, or any smaller amount disclosed herein. By depositing the catalyst nanoparticles after the buckypaper is formed with minimal binder, the catalyst nanoparticles can be directly deposited at the most efficient sites directly on the buckypaper for maximizing the three-phase reaction coefficient. Relative to conventional MEAs, the MEA according to the design disclosed herein has a higher catalyst utilization efficiency at the electrodes, a higher power output, and better resistance to oxidation, as well as longer service life.

In some embodiments, the buckypaper can include a second layer that serves as a gas diffusion layer (GDL) associated with the catalyst layer. In such embodiments, the second layer serving as a gas diffusion layer comprises longer, larger diameter nanofilaments, such as large diameter multi-wall nanotubes, carbon nanofibers, or both.

An unexpected feature of the membrane electrode assemblies disclosed herein is that they exhibit superior utilization of the catalyst disposed on the buckypaper catalyst layer. Two measurements of catalyst efficiency of interest include (i) the surface area utilization efficiency, and (ii) the catalyst utilization efficiency. The surface area utilization efficiency of the catalyst nanoparticles of the catalyst layer disclosed can be at least 60%, or at least 65%, or at least 70%, or at least 75%, or at least 75%, at least 80%, or at least 85%. The catalyst utilization efficiency of the catalyst nanoparticles of the catalyst layer disclosed herein can be 0.50 $g_{Pt}/kW$ or less, or 0.45 $g_{Pt}/kW$ or less, or 0.40 $g_{Pt}/kW$ or less, or 0.35 $g_{Pt}/kW$ or less, or 0.30 $g_{Pt}/kW$ or less, or 0.20 $g_{Pt}/kW$ or less.

As used herein, the "surface area utilization efficiency" is calculated as the quotient of the electrochemical surface area (ECSA), as calculated by Formula (1), infra, divided by the real surface area, as calculated by Formula (3), infra. As used herein, the "catalyst utilization efficiency" is calculated as the quotient of the catalyst loading divided by the cell output power at 0.65 V during cyclic voltammetry (CV) in a three-electrode/one-compartment cell at a temperature of 80° C. with a back pressure of 20 psi as a scan rate of 50 $mVs^{-1}$.

The catalyst nanoparticles can include platinum, iron, nitrogen, nickel, carbon and combinations thereof. The catalyst nanoparticles can be platinum or platinum(111) or $Pt_3Ni$ (111).

The membrane electrode assembly can incorporate the buckypaper catalyst layer as the cathode, the anode, or both. Preferably, the MEA includes the buckypaper catalyst disclosed herein as at least the cathode layer.

In another embodiment, the invention is drawn to a method of fabricating a membrane electrode assembly for a fuel cell. The method can include producing a catalyst layer that includes the steps of forming buckypaper and depositing catalyst nanoparticles on the buckypaper. Following the forming step, the depositing step, or both, the buckypaper can include 1 wt-% or less of binder. Following the forming step, the depositing step, or both, the catalyst layer can include 0.5 wt-% or less binder in the fully assembled MEA, or 0.25 wt-% or less binder, or 0.1 wt-% or less binder, or 0.05 wt-% or less binder, or the catalyst layer can include no binder. The buckypaper forming step can occur before the depositing step.

Once formed, the catalyst layer can be incorporated into the membrane exchange assembly using techniques known to those of skill in the art. For example, the membrane exchange assembly can be pressed onto the proton exchange membrane. The incorporation step can also include applying Nafion to the catalyst layer, the proton exchange membrane, or both. When applied to the catalyst layer following formation of the buckypaper, the Nafion serves to enhance proton conductivity from the catalyst nanoparticles through the proton exchange membrane to the other electrode. Unexpectedly, the incorporation of Nafion at this point in the process, and not as a binder used to form the buckypaper support, enables substantially higher surface area utilization efficiency (% utilization) and catalyst utilization efficiency ($g_{cat}/kW$).

The buckypaper can be fabricated using the steps of (1) dispersing an amount of MWNT's, CNFs, or both MWNTs and CNFs, with an amount of SWNTs in a liquid to form a suspension (wherein the nanotubes separate into individual fibers or small bundles and float in the non-solvent due to the large surface area of the nanotubes and strong molecular interactions); and then (2) filtering the suspension to remove the liquid, to yield a film that includes MWNTs, CNFs, or both MWNTs and CNFs, with SWNTs interspersed therethrough. In another embodiment, step (2) utilizes vaporization of the liquid to remove the liquid and form the buckypaper. It is also possible to use a combination of filtration and evaporation, either sequentially or simultaneously. The vaporization or filtration process may include the addition of heat, a pressure reduction, or a combination thereof.

The liquid can be a non-solvent. As used herein, the term "non-solvent" refers to any liquid media that are essentially non-reactive with the nanotubes and in which the nanotubes are virtually insoluble. Examples of suitable non-solvent liquid media include water and volatile organic liquids, such as acetone, ethanol, methanol, and n-hexane. The liquid may be an aqueous solution, and may be an aqueous-organic liquid mixture. Low-boiling point non-solvents are typically preferred so that the non-solvent can be easily and quickly removed from the matrix material. The liquid optionally may include a surfactant (such as a non-ionic surfactant, e.g., Triton X-100, Fisher Scientific Company, NJ) to enhance dispersion and suspension stabilization. The surfactant can be removed along with the rest of the liquid in the filtration or volatilization step.

In one embodiment, the method used to produce the buckypaper can produce a buckypaper with aligned nanotubes. The liquid removal may be performed following alignment of the nanotubes in the suspension, such that the alignment is substantially maintained after the liquid is removed. In one embodiment, nanotube alignment may be performed using in situ filtration of the nanotube suspensions in high strength magnetic fields, as described for example, in U.S. Patent Application Publication No. 2005/0239948 to Haik et al., which is incorporated herein by reference.

In another aspect, the buckypaper can include multiwall nanotubes and/or carbon nanofibers entangled with a small amount of single wall nanotubes. In one embodiment, the buckypaper can include MWNTs, CNFs, or a mixture thereof; and SWNTs entangled among the MWNTs, CNFs, or mixture thereof, wherein the buckypaper is between 5 wt % and 50 wt % SWNTs. In another embodiment, a buckypaper is provided that includes large diameter MWNTs, CNFs, or a mixture thereof, and small diameter MWNTs entangled among the large diameter MWNTs, large diameter CNFs, or mixture thereof wherein the film is between 5 wt % and 50 wt % small diameter MWNTs. The buckypaper is of sufficiently large length and width dimensions to be useful in the fuel cell applications disclosed herein.

Figure 2:
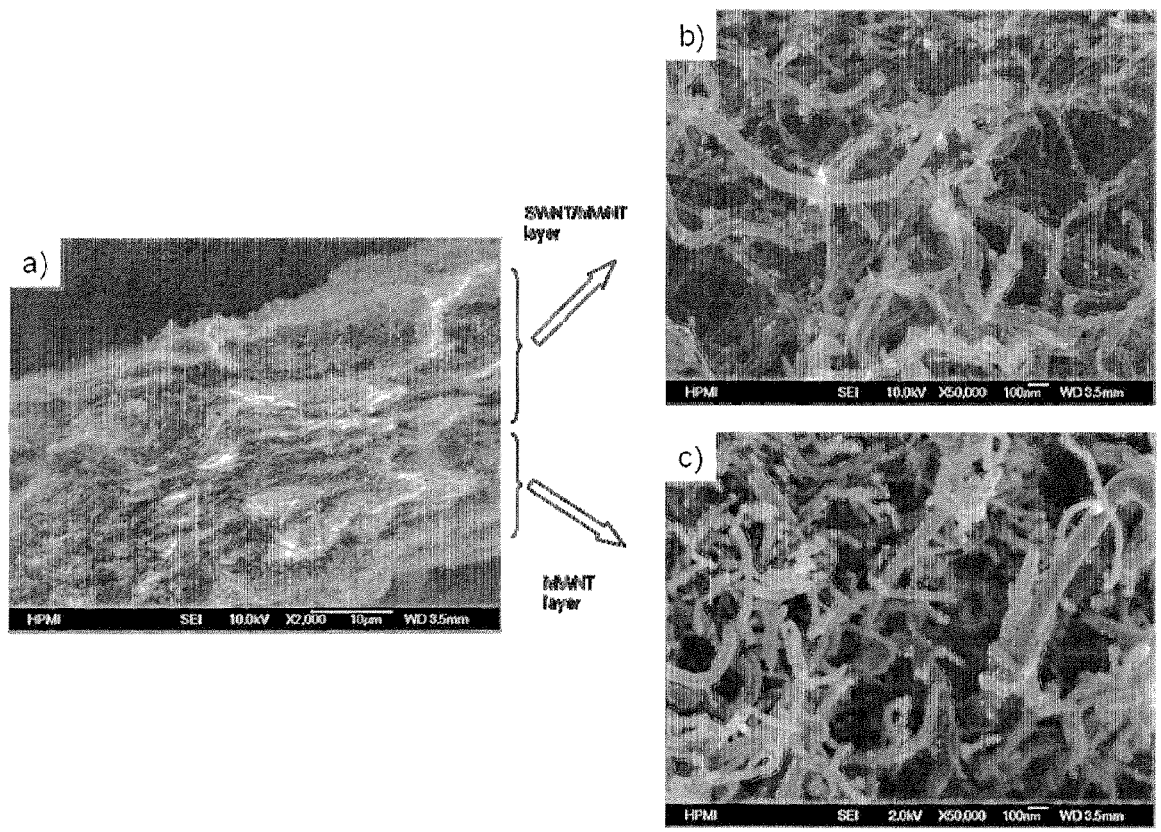
FIGS. 2a-c are cross-sectional views of platinum deposition morphologies for a membrane electrode assembly of a fuel cell, according to certain embodiments of the invention.

FIG. 2a shows the cross-section morphology of a double-layered buckypaper, composed of a layer comprising a mixture of single-wall nanotubes (SWNTs) and multi-wall nanotubes (MWNTs), and of another layer comprising MWNTs. FIG. 2b shows a top layer of the double-layered buckypaper made with the SWNTs/MWNTs mixture. FIG. 2c shows the bottom layer made with MWNTs.

Thus, the novel membrane electrode assembly according to the invention comprises carbon nanofilaments. It is worth emphasizing that the buckypaper is fabricated without using any binders. The nanofilaments preferably comprise SWNTs and a mixture of SWNTs and MWNTs or CNFs. For optimal microstructure of the buckypaper, a mixture of SWNTs and MWNT is in the ratio 1:5 (w/w), and a mixture of SWNTs and CNFs is 1:3 (w/w). The pore size of the buckypaper can be controlled, for example, using varied nanotubes having different tube diameters and lengths; as demonstrated experimentally, longer and larger nanotubes yield buckypaper having correspondingly larger pore sizes.

Figure 3:
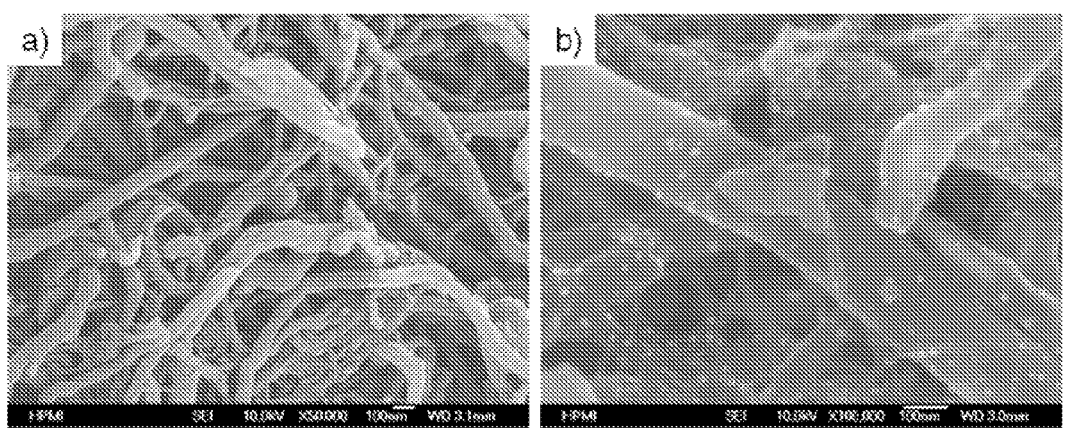
FIGS. 3a and 3b are views of surface morphologies of a membrane electrode assembly of a fuel cell, according to certain embodiments of the invention.

Multi-wall nanotubes with relatively larger diameters entangle, together forming a backbone in the side of the MWNT layer, which contacts the gas diffusion layer in the electrode to provide a porous channel for mass transfer. In the other side of the double-layered buckypaper, the small diameter SWNTs connect with the MWNT backbone, thereby providing more surface area and higher conductivity, which facilitates the three-phase electrochemical reactions. The catalyst nanoparticles are deposited on the surface of the buckypaper. Deposition can be effected by various methods, including electrochemical deposition, sputtering deposition, and supercritical deposition. A method of supercritical deposition useful in connection with the articles and methods disclosed herein is disclosed by Bayakçeken et al., "Pt-based electrocatalysts for polymer electrolyte membrane fuel cells prepared by supercritical deposition technique," Journal of Power Sources, Vol. 179, pp. 532-40 (2008). FIG. 3a shows the surface morphology of platinum coating of the double-layered buckypaper (side of SWNTs/MWNTs mixture) coated by DC sputtering (PtBA-A). FIG. 3b shows the surface morphology of Pt coating a SWNTs and CNFs mixture buckypaper by electrochemical deposition (PtBP-B).

Figure 4A:
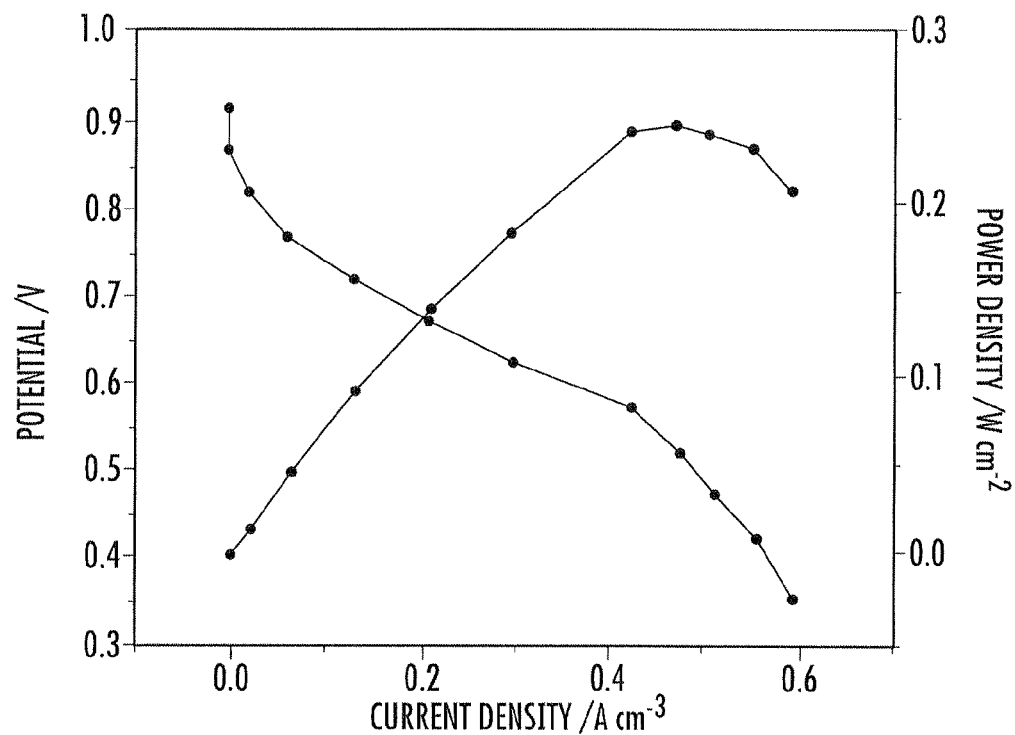
FIGS. 4a and 4b are plots of cell potential and output performance as a function of current density for single cells with catalyst PtBP-A and PtBP-B as cathode catalyst layer.
Figure 4B:
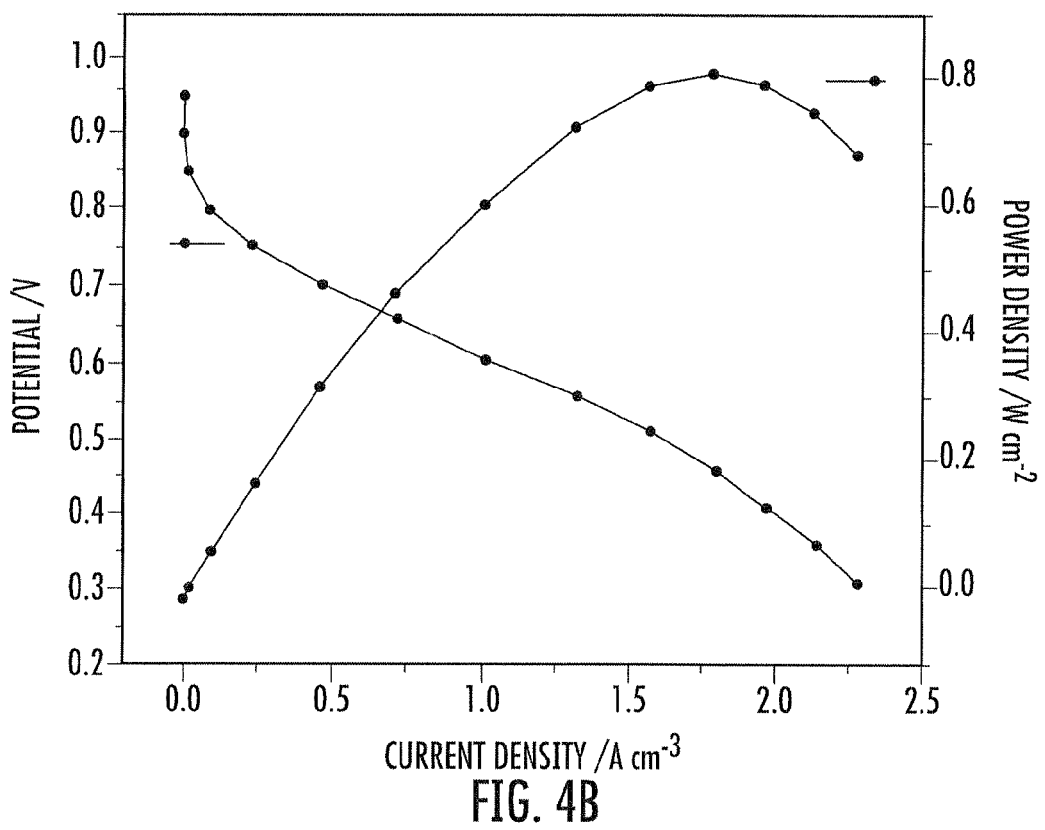

The Pt surface area utilization efficiency was determined by cyclic voltammetry to be 85% or higher, whereas the surface usage of a conventional Pt/C catalyst was determined to be approximately 31%. By utilizing Pt-coated buckypaper as a catalyst layer at the cathode, the MEA exhibited a very high Pt utilization rate and power output. FIG. 4a is a plot of the cell potential and output performance as a function of current density at 80° C. for single cells with catalyst PtBP-A (Pt loading: 0.02 mg cm$^{-2}$) as cathode catalyst layer with humidified $H_2/O_2$ as the fuel/oxidant at a back pressure of 1.36 atm. FIG. 4b is a plot of the cell potential and output performance as a function of current density at 80° C. for single cells with catalyst PtBP (PT loading: 0.13 mg cm$^{-2}$) as cathode catalyst layer with humidified $H_2/O_2$ as the fuel/oxidant at a back pressure of 1.36 atm. The power outputs at 0.65V are 156 mW cm$^{-2}$ and 468 mW cm$^{-2}$ for two cells. This means the Pt utilizations are 0.13 $g_{Pt}$/kW and 0.28 $g_{Pt}$/kW for the platinum-buckypaper cathodes, which is a very significant improvement over values for current state-of-the-art devices (0.85-1.1 $g_{Pt}$/kW). See, e.g., H. A. Gasteiger, S. S. Kocha, B. Sompalli, and F. T. Wagner, "Activity Benchmarks and Requirements for Pt, Pt-alloy, and non-Pt oxygen reduction catalysts for PEMFCs," in Applied Catalysis B-Environment 56 (2005), 9-36. The Pt utilization values demonstrate that less than one-third the amount of platinum (0.28 $g_{Pt}$ compared to 0.85 $g_{Pt}$) is necessary to produce a kW of power compared to the current state-of-the-art devices.

The unexpectedly high catalyst efficiency of the Pt/buckypaper composites may be due to at least three factors: first, its unique microstructured well-connected nanotube network ensures a pathway for electrons and gas; second, the Pt is electrodeposited on the most efficient contact zones for the electronic and electrolytic pathways of the buckypaper samples; and, third, the Pt nanoparticles are covered with little or no binder material, such as Nafion. As a result, nearly the entire surface of the Pt particles is electrochemically active and can form a three-phase boundary.

EXAMPLES

Electrical Property Evaluations

Preparation and Characterization of Buckypaper

SWNTs 0.8-1.2 nm in diameter and 100-1000 nm long were obtained from Carbon Nanotechnologies Inc, while CNFs 100-200 nm in diameter and 30-100 μm long from Applied Sciences Inc were produced using a chemical vapor deposition (CVD) method. All materials were used as received without further purification.

SWNT/CNF-mixed buckypaper sheets were produced using a vacuum filtration method. A mixture of SWNTs and CNFs (w/w 1:3 or 1:5), in 1000 ml deionized water was sonicated to form a homogenous dispersion by adding Triton-X (Dow) as a surfactant. The suspension was then filtered under a vacuum through a nylon membrane (Millipore) having a 0.45 μm pore size. The filtrate film was washed thoroughly with isopropanol to remove the residual surfactant. After drying, a thin film layer was peeled from the filtration membrane and a freestanding buckypaper (BP) was obtained.

A Tristar 3000 (Micrometritics) was used to characterize the buckypaper's BET surface areas and pore size distribution using a nitrogen adsorption method. The SWNTs and CNFs of the buckypaper entangled together to produce good mechanical properties.

Preparation and Characterization of Buckypaper-Supported Pt Electrocatalysts

Platinum (Pt) nanoparticles were deposited onto the buckypaper using a pulse electrodeposition technique from a mixture solution of 10 mM $H_2PtCl_6$, 0.1 M $H_2SO_4$, and 0.5 M ethylene glycol with $N_2$ bubbling. The applied potential increased from 0.2 V to −0.25 V (versus the saturated calomel electrode) with a pulse width of 1 s and a pulse duty cycle of 25%. The pulse was repeated until the desired Pt loading was reached. The Pt loading was determined by weighing the mass difference before and after deposition.

The morphology of the platinum on the buckypaper (Pt/BP) was characterized using a scanning electron microscope (SEM, JEOL JSM 7401F). X-ray diffraction (XRD) patterns of the buckypaper-supported Pt were recorded using a CuKα line from a Siemens D500 diffractometer. The electrochemical surface area of Pt/BP catalysts was characterized by using cyclic voltammetry (CV) in a three-electrode/one-compartment cell. A saturated calomel electrode (SCE) was used as the reference electrode and Pt gauze as the counter electrode. To prepare the working electrode, a piece of the prepared Pt/BP was stuck to the top of a glassy carbon (GC) electrode (0.07 cm$^2$) by using a drop of 0.5% Nafion solution. The electrolyte solution was 0.5 M $H_2SO_4$, which was thoroughly deaerated by bubbling $N_2$ gas for 30 minutes. A $N_2$ atmosphere was maintained over the solution during the test. The potential ranged from −0.25 V to +1.0 V at a scan rate of 50 mV s$^{-1}$.

In comparison, a conventional Pt/C (20 wt. %, E-TEK) catalyst was applied to the glassy carbon electrode with a Pt loading of 0.2 mg cm$^{-2}$ and tested by CV with the same experimental conditions. The CV curves were also recorded in an oxygen saturated 0.5 M H$_2$SO$_4$ solution from 0.1 V to 0.9 V at a scan rate of 50 mV s$^{-1}$ to observe the oxygen reduction peak.

Fabrication and Characterization of MEA

The electrochemical performance of the Pt/BP electrocatalysts as a cathode catalyst layer was determined in a single 5 cm$^2$ PEMFC. The anode catalyst was commercial 20 wt. % Pt/C, and the membrane was an H$_2$O$_2$ and H$_2$SO$_4$ pretreated Nafion-112 (Dupont) composite. The back layer of the electrode was teflonized (30 wt. % Teflon in cathode, 10 wt. % in anode) carbon paper (TGPH-090, Toray). The gas diffusion layers (GDL) for both the cathode and anode were prepared by spraying an isopropanol mixture of the Vulcan XC-72 carbon black and a 30 wt. % or 10 wt. % Teflon emulsion onto the back layer. The GDL composite was then sintered at 340° C. for 1 h.

For the anode, a Pt/C catalyst was applied by using a conventional ink process. The proper amount of the Pt/C catalyst was mixed with 10 wt-% Nafion in isopropanol and then air-sprayed on the GDL to constitute the catalyst layer with a Pt loading of 0.1 mg cm$^{-2}$. The Pt deposited buckypaper was placed on the cathode GDL to serve as a catalyst layer where the selected side of the buckypaper was exposed. Finally, a thin layer of Nafion solution (1.0 mg/cm$^2$) was sprayed onto the surface of each catalyst layer. The membrane electrode assembly was formed by sandwiching the electrolyte membrane between the anode and cathode and hot-pressing it at 130° C. for 3 minutes under 30 kg cm$^{-2}$ of pressure.

It is to be understood that the Nafion applied to the completed catalyst layer is used in order to enhance proton conductivity from the catalyst nanoparticles into the proton exchange membrane. Unexpectedly, the incorporation of Nafion at this point in the process enables substantially higher surface area utilization efficiency (% utilization) and catalyst utilization efficiency (g$_{cat}$/kW).

The resulting single cell was operated by a fuel cell testing system (Fuel Cell Technologies) with humidified H$_2$ as the fuel and humidified O$_2$ as the oxidant. The operation conditions were: humidifier temperature: 80° C. for both reactants, cell temperature: 80° C., and gas pressure at 20 psi on both sides. A pair of Pt wires was assembled in the cell at the anode side to act as the reference electrode (dynamic hydrogen electrode). The cell performance and electrode overpotentials were recorded by electronic load assembled in the testing system.

Results and Discussion

Properties of Buckypaper

Figure 5:
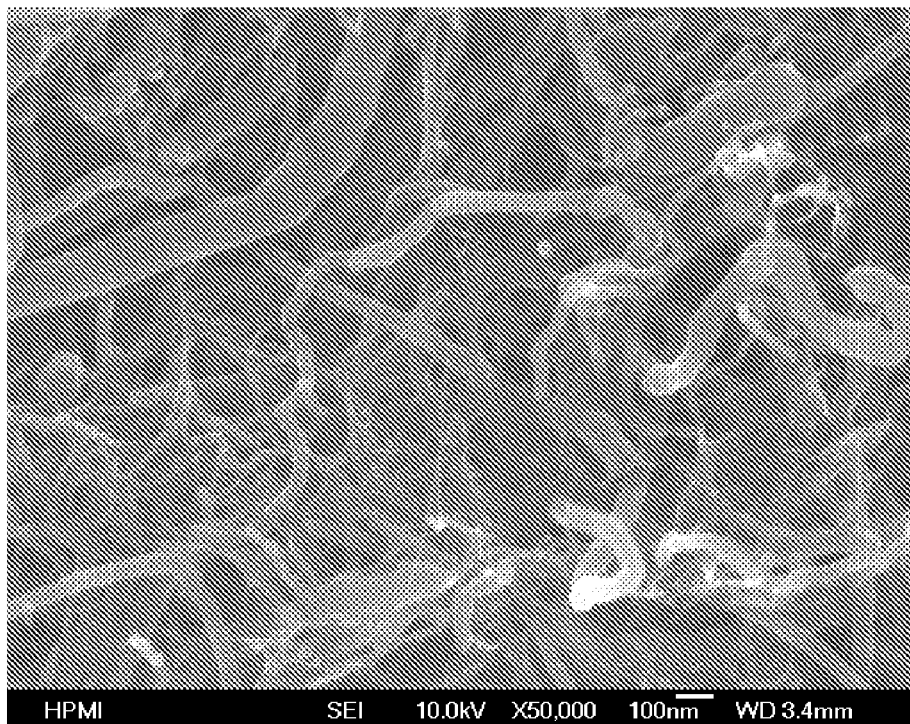
FIGS. 5a and 5b are SEM images showing surface morphology of buckypaper.
Figure 5:
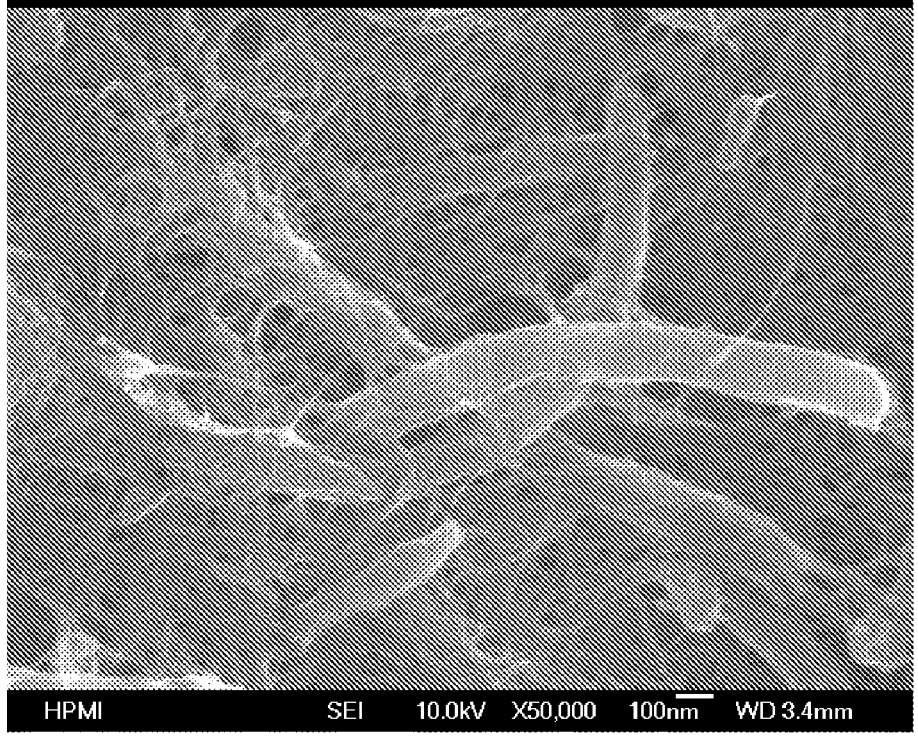

The as-produced SWNT/CNF mixture buckypapers (described as SF13 for weight ratio of 1:3 and SF15 for weight ratio of 1:5) were approximately 35 μm thick and exhibited a porosity of 85%, which was measured by mercury porosimetry method. FIG. 5 shows SEM images of the surface morphology of the buckypapers. The images show that the large CNFs entangle together to form a backbone where a meshwork of much smaller SWNTs create the surface covering layer. A large volume fraction of CNFs constitute most of the pore volume due to the mesopores (>10 nm) as determined by the nitrogen adsorption method (data not shown). It also shows that buckypaper with more CNFs has larger average pore size. Comparing to the pure SWNT buckypaper, which has an average pore size of approximately 5 nm and a porosity of approximately 75%, the SWNT/CNF mixture buckypaper exhibits larger pore size and porosity. Thus, the SWNT/CNF buckypaper should exhibit a higher permeability which may facilitate improved mass transfer in the fuel cell. A small quantity of the SWNT-connected large nanotubes was added to ensure the electronic conductivity. The electronic conductivities measured by the four-probe method were ~11 S cm$^{-1}$ for the SF13 buckypaper, which were greater than that of the carbon black XC-72 (4 S cm$^{-1}$).

Catalyst Performance

Figure 6:
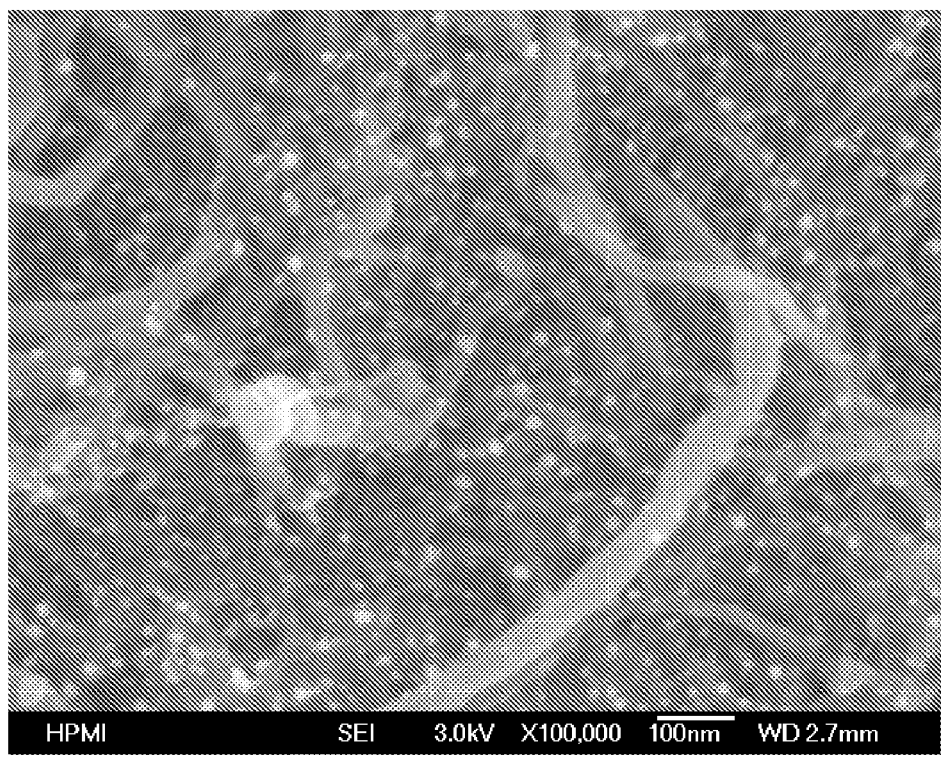
FIGS. 6a and 6b are SEM images showing the surface morphology of a catalyst layer formed from buckypaper with platinum nanoparticles disposed thereon.
Figure 6:
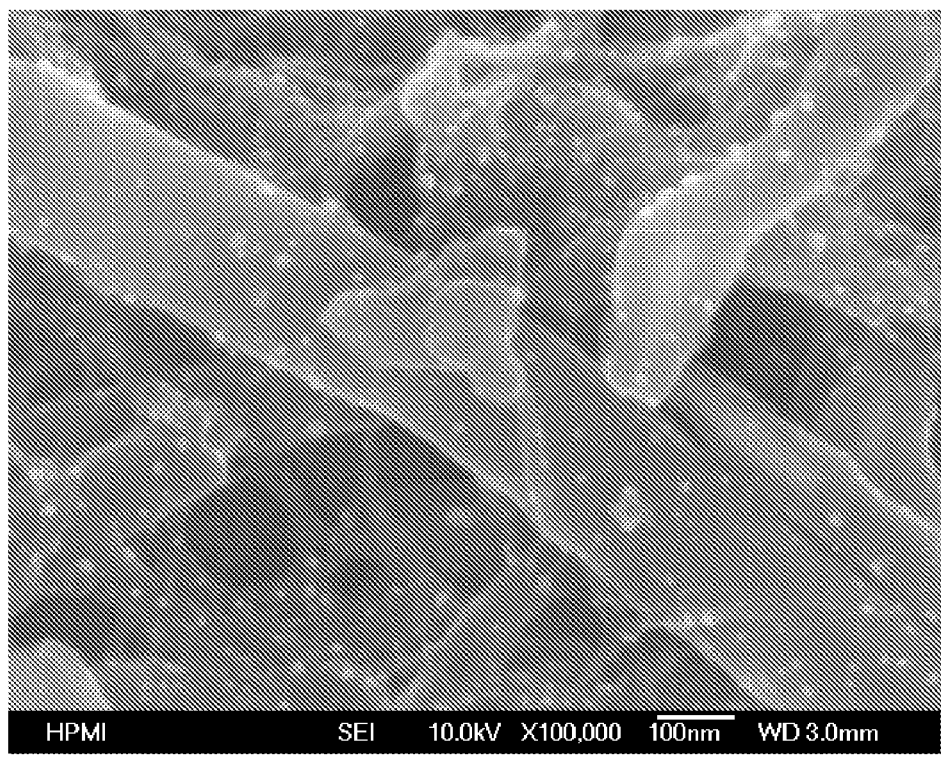
Figure 7:
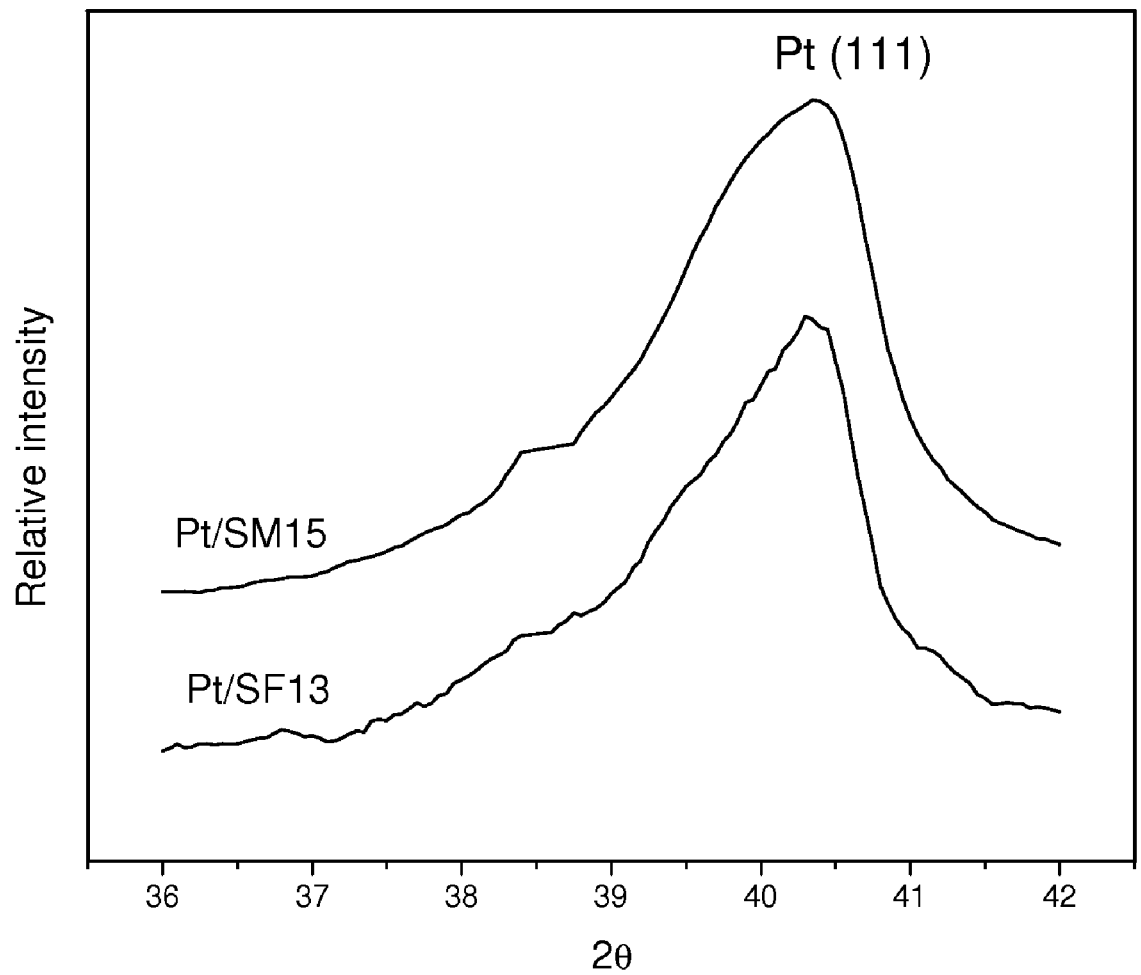
FIG. 7 is a graph of the Pt(111) diffraction peak in the powder X-ray diffraction pattern for a buckypaper-supported Pt catalyst layer.

FIG. 6 shows the surface morphology of buckypapers having approximately 0.1 mg cm$^{-2}$ of Pt deposited thereon. The image displayed in FIG. 6 shows that the Pt particles on the surface of the nanotubes have a wide particle size distribution of 5-30 nm. This seems to indicate that the large Pt particle (>20 nm) was formed by the agglomeration of small particles with a size of several nanometers. The Pt particle's size was also calculated from the strongest x-ray diffraction peak (111) of Pt in the XRD pattern (FIG. 7), according to the Scherrer formula, as shown below:

$$D(\text{nm}) = \frac{0.9\lambda}{\beta_{1/2}\cos\theta} \quad (1)$$

where D is the mean size of the Pt particles, λ is the X-ray wavelength (Cu Kα line at λ=1.542 Å), $\beta_{1/2}$ is the half-peak width for Pt (111) in radians, and θ is the angle corresponding to the (111) peak. Thus, the mean Pt particle sizes are 5.7 nm for Pt/SF13 and 6.0 nm for Pt/SF15. Those sizes were greater than those produced by an impregnation method, e.g., 2-4 nm Pt particles on the MWNTs obtained by reducing platinum ion salt in the ethylene glycol solution. These results indicate that most of the Pt particles were grown on the surface of the SWNTs, which indicates greater active sites for electrodeposition on the as-received SWNTs than the as-received CNFs.

Figure 8:
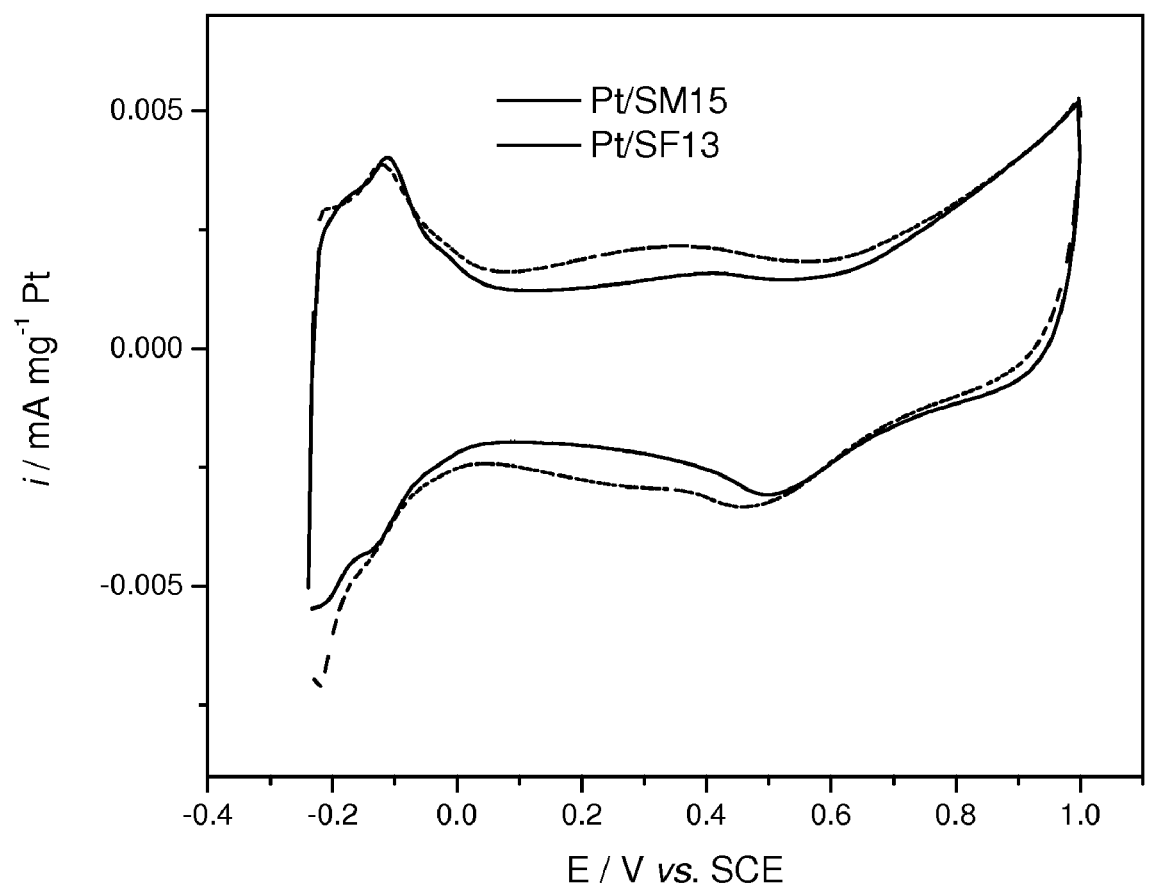
FIG. 8 is a cyclic voltammogram of buckypaper-supported Pt catalyst in nitrogen-saturated $H_2SO_4$ at a scan rate of 50 $mVs^{-1}$.

The electrocatalytic activity of the buckypaper-supported Pt catalyst was evaluated using cyclic voltammetry in the electrolyte of 0.5 M H$_2$SO$_4$, which is shown in FIG. 8a. The area of the electrochemical activity surface in the catalyst where the electrochemical reaction (e.g. oxygen reduction reaction) takes place, also described as the electrochemical surface area (ECSA), can be obtained by the integration of the H$_2$-adsorption peak in the hydrogen region (−0.2 to 0.15 V vs. SCE) of the voltammograms with subtraction of the current due to double layer charging. The ECSA was calculated using the following equation:

$$ECSA = \frac{Q_H}{[Pt] \times 0.21} \quad (2)$$

where Q$_H$ is the coulombic charge for hydrogen adsorption obtained by integration measure in mC cm$^{-2}$, [Pt] is the Pt loading measured in mg cm$^{-2}$, and the factor of 0.21 mC cm$^{-2}$ represents the charge required to oxidize a monolayer of H$_2$ on bright Pt. The calculated ECSA for the Pt/SF13 and the Pt/SF15 electrocatalyst were 43.3 m$^2$ g$^{-1}$ and 39.2 m$^2$ g$^{-1}$, respectively. In comparison, the ECSA for the commercial Pt/C, calculated using a similar method, was 39.7 m$^2$ g$^{-1}$. There is slightly difference in intensity was observed between the oxygen reduction peaks for Pt/buckypaper and Pt/C catalysts measured in O$_2$-saturated environment (FIG. 8b) indicating the three catalysts have the similar catalytic activities for oxygen reduction rate (ORR). However, a shift to high potential for oxygen reduction peak was shown in Pt/buckypaper catalyst comparing to Pt/C catalyst due to the increase in the Pt particle size. Therefore, the Pt/buckypaper catalysts have slightly larger ECSAs than the commercial Pt/C in spite of much larger Pt particles. This indicates high catalyst utilization was achieved by using buckypapers as catalyst supports. The Pt usage could be estimated as the ratio of ECSA over the real specific surface area (SA) of Pt, which indicates how many surface Pt atoms are active in electrochemical reactions. The real surface area of Pt can be calculated by assuming that all particles are in uniform spherical shape with the following equation:

$$SA = \frac{\text{surface area}}{\text{mass}} = \frac{\pi D^2}{\frac{1}{6}\pi D^3 \rho} = \frac{6}{\rho D} \quad (3)$$

where, $\rho$ is the mass density of Pt (21.4 g cm$^{-3}$) and D is the mean diameter of Pt particles in the catalyst.

By applying the mean diameter derived from the Scherre formula (formula 1), the Pt surface area utilization efficiency on the SF13 buckypaper support and the SF15 buckypaper support were 88% and 84%, respectively, while the commercial Pt/C was only 31%. As used herein, the "Pt surface area utilization efficiency" is calculated as the quotient of the ECSA as calculated by Formula (1) divided by the real surface area as calculated by Formula (3).

Although not necessary for practicing the invention and while not wishing to be bound by theory, the unexpectedly high Pt surface usage rates for buckypaper supported catalysts may be due to the following two reasons: (1) Pt particles were electrodeposited onto the buckypaper in the aqueous solution, and the sites where the Pt particles were located were the most efficient contact zones for the electronic and electrolytic pathways of the buckypaper samples. As a result, almost all of the surface of the Pt particles was an electrochemically active site, even though the Pt particle size needs to be reduced further; (2) The electrochemical surface area of Pt/C was partially lost by the ink process for applying Pt/C catalyst to the electrode due to the blocking of the binding agent (e.g. Nafion) at the Pt sites, especially for the Pt loaded on the micropores inside the agglomerates of the carbon black.

For the Pt/BP catalyst, the addition of the binding agent is not necessary because the buckypaper is a well-established membrane and Pt particles are located on the external surface of the large porous structures of CNF backbone network. The ability to produce a Pt nanoparticle catalyst on a stable support without a binder, e.g., Nafion, may prevent the Pt from being blocked. However, it should be pointed out that Pt particles were deposited on the external surface of SWNT or CNF rather than the tube/tube contact point, and the volume of Pt is negligible in the buckypaper. The deposited Pt particles therefore made little effect on the connection between tubes which is a critical issue to the mechanical property.

Electrode Performance in a Single Cell

Figure 9:
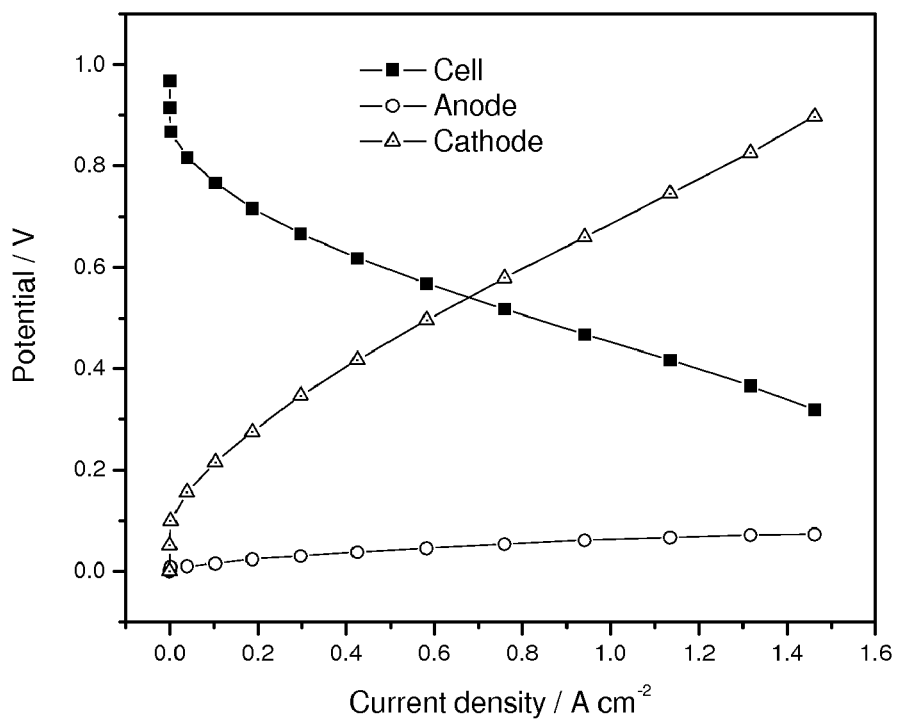
FIGS. 9a and 9b are cell polarization curves and electrode overpotential as a function of current density at 80° C. with 1.36 atm backpressure and humidified $H_2$ and $O_2$ as the fuel and oxidant, respectively.
Figure 9:
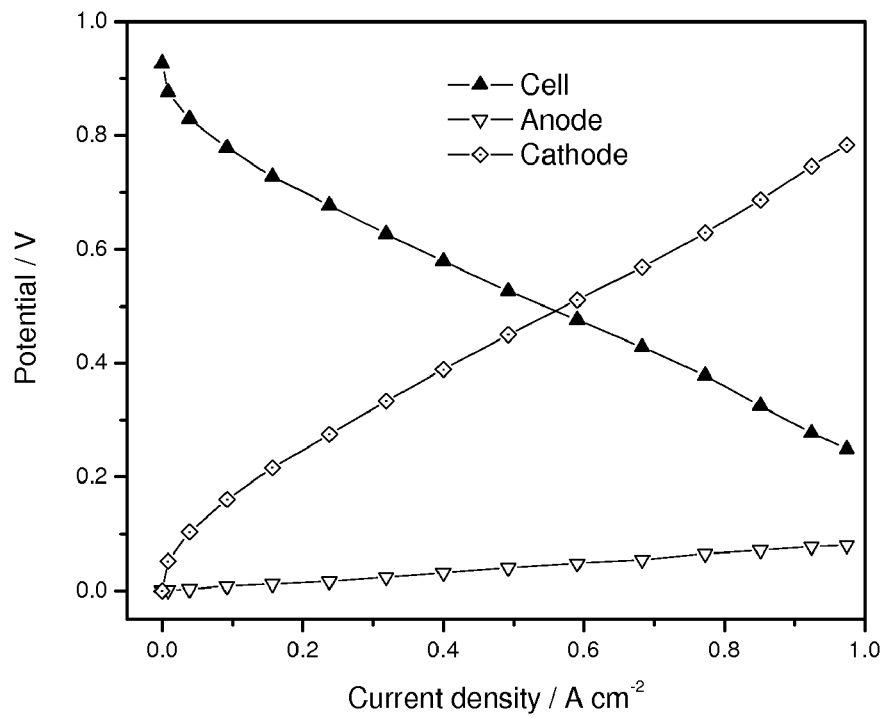

FIG. 9 shows the single cell performance (I-V curve) and electrode overpotential for the cells using the Pt/SF13 (Cell I) and the Pt/SF15 (Cell II) as the cathode with a Pt loading of 0.092 mg cm$^{-2}$ and 0.14 mg cm$^{-2}$, respectively. The cell outputs measured at 80° C. with a back pressure of 20 psi were 285 mA cm$^{-2}$ for Cell I and 760 mA cm$^{-2}$ for Cell II both at 0.65 V. The Pt utilization efficiency in the MEA, defined as the Pt loading divided by the cell output power at 0.65 V, was 0.5 $g_{Pt}$ kW$^{-1}$ for the Pt/SF13 cathode and 0.28 $g_{Pt}$ kW$^{-1}$ for the Pt/SF15 cathode. The much higher Pt utilization achieved by Pt/SF15 catalyst may due to the fact that the larger pore size and porosity introduced by more CNFs facilitate the mass transfer in the catalyst layer. The Pt utilization was much improved, i.e., lower, over the current state-of-the-art value (0.85-1.1 $g_{Pt}$ kW$^{-1}$) achieved by the conventional Pt/C catalyst. In other words, the MEAs that included a Pt/buckypaper cathode required significantly less Pt for each kW of electrical power produced. Table 1 summarizes the Pt particle size, cell output power, Pt loading, and Pt utilization corresponding to buckypaper-supported catalysts. The reported values for CNT-supported Pt catalysts in the literature are also listed for comparison.

| Cathode | Pt particle size (nm) | Cell output at 0.65 V (mA cm$^{-2}$) | Pt loading (mg cm$^{-2}$) | Pt utilization ($g_{Pt}$ kW$^{-1}$) |
|---|---|---|---|---|
| Pt/SM15 buckypaper | ~5.9 | 346 | 0.124 | 0.55 |
| Pt/SF13 buckypaper | ~5.7 | 285 | 0.092 | 0.5 |
| Pt/CNTs | 2.2 | 800[a] | 0.4 | 0.77 |
| Pt/CNTs | ~4 | 375[b] | 0.25 | 1.03 |
| Pt/twisted CNFs | ~4 | 450[b] | 0.25 | 0.85 |
| Pt/MWNTs | 3-5 | 620[c] | 0.5 | 1.24 |
| Pt/oriented CNTs | ~2.8 | 605[d] | 0.2 | 0.51 |

[a]Operating condition: $H_2/O_2$, 70° C., 3 atm;
[b]Operating condition: $H_2/O_2$, 80° C., 1 atm;
[c]Operating condition: $H_2/O_2$, 80° C., 15 psi;
[d]Operating condition: $H_2/O_2$, 70° C., 2 atm Based on the information provided in Table 1, the Pt catalyst showed much higher catalytic efficiency when supported by the mixed buckypaper supports, even though the electrocatalytic activity of Pt/CNT improved compared to Pt/C due to the outstanding properties of carbon nanotubes, i.e. high electronic conductivity and large transfer rate for reduction of oxygen. Pt/buckypaper catalyst showed such high Pt utilization in spite of the relatively large Pt particles obtained by electrochemical deposition compared to the reported data in Table 1. It is believed that the Pt utilization of the Pt/buckypaper may be improved to 0.2 $g_{Pt}$ kW$^{-1}$, which can fulfill the future requirements of PEMFC electrocatalytsts for automotive application by reducing the Pt particle size to 2-3 nm. In addition, the mass activity of the Pt catalyst (A mg$^{-1}$$_{Pt}$) for an oxygen reduction rate (ORR) was demonstrated to be almost doubled when the surface area of Pt increased from 40 m$^2$ g$^{-1}$ to 90 m$^2$ g$^{-1}$ ($d_{Pt}$≈3 nm).

Another explanation for the unexpectedly superior electrical properties of the instant Pt/BP materials is the method in which they are fabricated. In this new method, a free-standing buckypaper consisting of CNT was formed. Platinum nanoparticles were then deposited on the buckypaper in a liquid solution and were not uniformly distributed on the CNT surface. The advantages of a catalytic electrode made with this new method include: (1) its unique microstructured well-connected nanotube network provides a pathway for electrons; (2) the Pt is not uniformly distributed on the surface of each CNT, rather the platinum is electrodeposited on the most accessible sites in the buckypaper and is not covered by either CNTs or binder materials; and (3) the open vacancies (pores) mostly in the meso- to macro-size range can be effectively covered by Nafion electrolytes, which facilitates the maximization of the three-phase boundary (TPB) where the electrochemical reaction takes place. In addition, the high porosity of buckypaper also benefits the mass transfer process within the catalyst layer resulting in further improvement for Pt utilization. Furthermore, the buckypaper can be made with the porosity grading in such a manner that the high porosity at fuel and air side for anode and cathode catalytic electrodes, respectively, that benefits the mass transfer; and the low porosity at membrane side that allows high Pt loading density at or near membrane interface. The Pt/buckypaper cathode also showed greater durability in electrochemical oxidation than the Pt/C cathode, which will be published separately.

Durability Evaluations

Experimental

For the durability study, Pt/buckypaper catalysts were prepared by the electrochemical deposition method described above. Briefly, SWNT/CNF-mixed buckypaper sheets were produced first by filtrating an aqueous suspension of SWNTs (O.D. 0.8-1.2 nm, L. 100-1000 nm, Carbon Nanotechnologies Inc.) and CNFs (O.D. 100-200 nm, L. 30-100 µm, Applied Sciences Inc.) at a mixing ratio of 1:5 (w/w). Platinum nanoparticles were electrochemically deposited onto the buckypaper by applying square current pulses of 15 mA/cm$^2$ with a duty cycle of 1 second/9 seconds from a mixture solution of 10 mM $H_2PtCl_6$, 0.1 M $H_2SO_4$, and 0.5 M ethylene glycol. The platinum loading was determined by weighing the mass difference before and after deposition. The Pt/buckypaper (BP) catalyst was used as a cathode catalyst layer in a 5 cm$^2$ MEA to evaluate the electrochemical performance.

The accelerated degradation tests (ADTs) were carried out at room temperature in a three-electrode cell setup with a CT-2000 potentiostat (Arbin) in a 0.5 M $H_2SO_4$ solution to mimic polymer exchange membrane fuel cell (PEMFC) conditions. A saturated calomel electrode (SCE) was used as the reference electrode, and Pt gauze was used as the counter electrode. All potential values mentioned below refer to the reversible hydrogen electrode (RHE), unless specifically indicated.

To prepare the working electrode, a piece of the prepared Pt/BP material was attached to the top of a glassy carbon (GC) electrode (0.07 cm$^2$) by using a drop of 0.5% Nafion solution. For powder samples, e.g., Pt/Vulcan XC-72, the working electrodes were prepared by applying the ink to the glassy carbon electrode. The as-received commercial Vulcan XC-72 (Cabot), Pt/Vulcan XC-72 (E-Tek, 20 wt. %, refer as Pt/C-pristine) and heat-treated Pt/Vulcan XC-72 (in $H_2$ at 500° C. for 3 hours, refer as Pt/C-500) were used to prepare the ink by dispersing 7.0 mg Pt/C in 1 mL isopropanol for 30 min. Five µL catalyst ink was pipetted onto the disk using a micropipette to ensure Pt loading of 0.1 mg/cm$^2$. After the evaporation of isopropanol, 1 µL Nafion solution (10 mg/mL) was applied onto the electrode surface in order to strongly attach the catalyst particles to the glassy carbon substrate. The electrolyte solution was thoroughly deaerated by bubbling $N_2$ gas continuously during the test.

Two test strategies of ADT were used in this study: 1) a constant potential (1.2 V) was applied to a working electrode for 400 hours, and the electrochemical surface area (ECSA) of catalysts was characterized every 10 hours by using cyclic voltammetry (CV) from 0 V to 1.35 V at a scan rate of 50 mV/s; and 2) square-wave potential cycles between 0.85 V for 15 s and 1.4 V for 45 s were applied for extremely accelerated durability tests. The CV was recorded hourly to monitor the electrochemical surface area. The morphologies of the catalysts before and after accelerated degradation test (ADT) experiments were characterized using a transmission electron microscope (TEM, JEM-2010, JEOL). The electrochemical oxidation of carbon black (Vulcan XC-72) and buckypaper was investigated by applying a constant potential of 1.2 V on both carbon electrodes. Throughout the oxidation process, CVs were recorded every 10 hrs from 0-1 V at 50 mV/s.

Results and Discussion

Carbon Corrosion

In order to facilitate mass transfer in the catalyst layer, buckypaper should have high porosity and relatively large pore size. Thus, a large portion of CNFs (83.3 wt. %) was added to prepare buckypaper since CNFs are much larger in diameter and length than SWNTs. Therefore, CNF is considered to mainly contribute to the corrosion resistance of buckypaper due to the high chemical reactivity of small-diameter SWNTs and the relatively high graphitization of CNFs, although little data is reported on the electroxidation behavior of CNFs. Cyclic voltammograms of buckypaper and carbon black (Vulcan XC-72) after electroxidation at 1.2 V for different durations are showed in FIGS. 10a and 10b, respectively. Both figures show that the obvious peaks in the hydroquinone-quinone (HQ-Q) redox region (0.35-0.75 V) during the anodic scan increased in the peak current throughout electroxidation.

Figure 10:
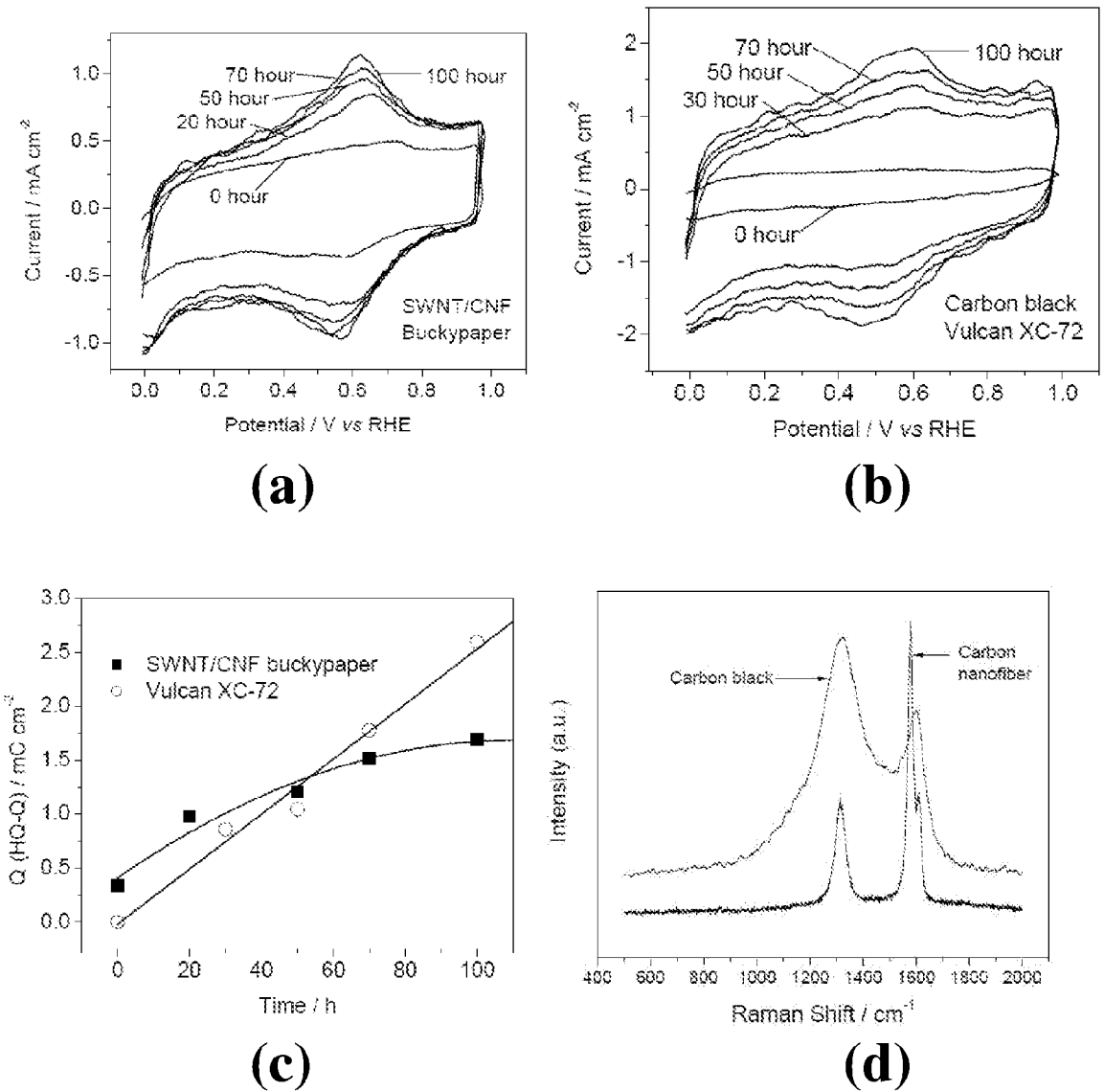
FIG. 10 includes cyclic voltammograms of a) SWNT/CNF buckypaper and b) Vulcan XC-72 at different time intervals during electroxidation in $N_2$ purged 0.5M $H_2SO_4$; c) the amount of the charge from HQ-Q redox as a function of hold time at 1.2 V as determined from cyclic voltammetry shown in a) and b); d) Raman spectra of carbon nanofiber and Vulcan XC-72.

The current peaks came from the oxidation of quinone from hydroquinone on the support surface. The amount of charge due to the above surface oxidation reaction was quantitatively obtained by integrating the areas of the HQ-Q peak, minus the pseudo-capacitance charge, which is shown in FIG. 10c. This demonstrates that, except at the initial stages of oxidation, the rate of surface oxidation for buckypaper is one-half time slower than that of carbon black. Carbon nanofibers used in this work were high-temperature (3000° C.) treated stacked-cup nanofibers having morphology of stacked, truncated conical graphene layers along the fiber length.

Although not wishing to be bound by theory and while not necessary for practicing the invention, it is believed that the unexpectedly improved durability of buckypaper may be related to some of the following observations. It was determined that buckypaper yielded more charges at the initial stage compared to carbon black, which may be due to the defects on SWNT formed during the purification process in strong acids. However, further in-depth oxidation becomes increasingly difficult because the top layers of the CNF graphene may act as a barrier, preventing the inner basal planes from being oxidized. Similar phenomena were found in the electroxidation of multi-wall nanotubes (MWNTs), which showed a stabilized amount of oxides on the surface after the initial period. Conversely, carbon black showed progressive oxidation due to the large amount of amorphous carbon and discontinuous graphite crystallites in carbon black, providing abundant sites for electrochemical oxidation to occur. The Raman spectra of CNF and carbon black, shown in FIG. 10d, reveal that CNF has a larger crystalline size along the basal plane than carbon black because of the smaller relative peak intensity ratio of D (disorder-) band to the G (graphite-) band ($I_d/I_g$). The electroactive HQ/Q functional groups reportedly account for only a small fraction (approximately 3%) of the total surface oxides generated (e.g. carboxylic, lactone, etc.) on carbon black, which was detected by TGA-MS. A very similar trend of oxide increase was found in the HQ/Q reaction and all oxidizing reactions. Therefore, SWNTs/CNFs mixture buckypaper are unexpectedly more resistant to electrochemical oxidation than Vulcan XC-72 carbon black under the same simulating fuel cell condition.

Accelerated Durability Test

ADT was carried out in a three-electrode cell with an aqueous solution of 1 M $H_2SO_4$, which mimics the environment of the electrode-membrane interface on the cathode side. Since the electrode was completely immersed in the electrolyte in the experiments, the entire active surface of the catalyst could take part in the electrochemical reactions, while only the catalyst on the interface of the membrane and electrode was active in a membrane electrode assembly (MEA). Therefore, the deterioration of the catalyst was accelerated under this specific condition.

Figure 11:
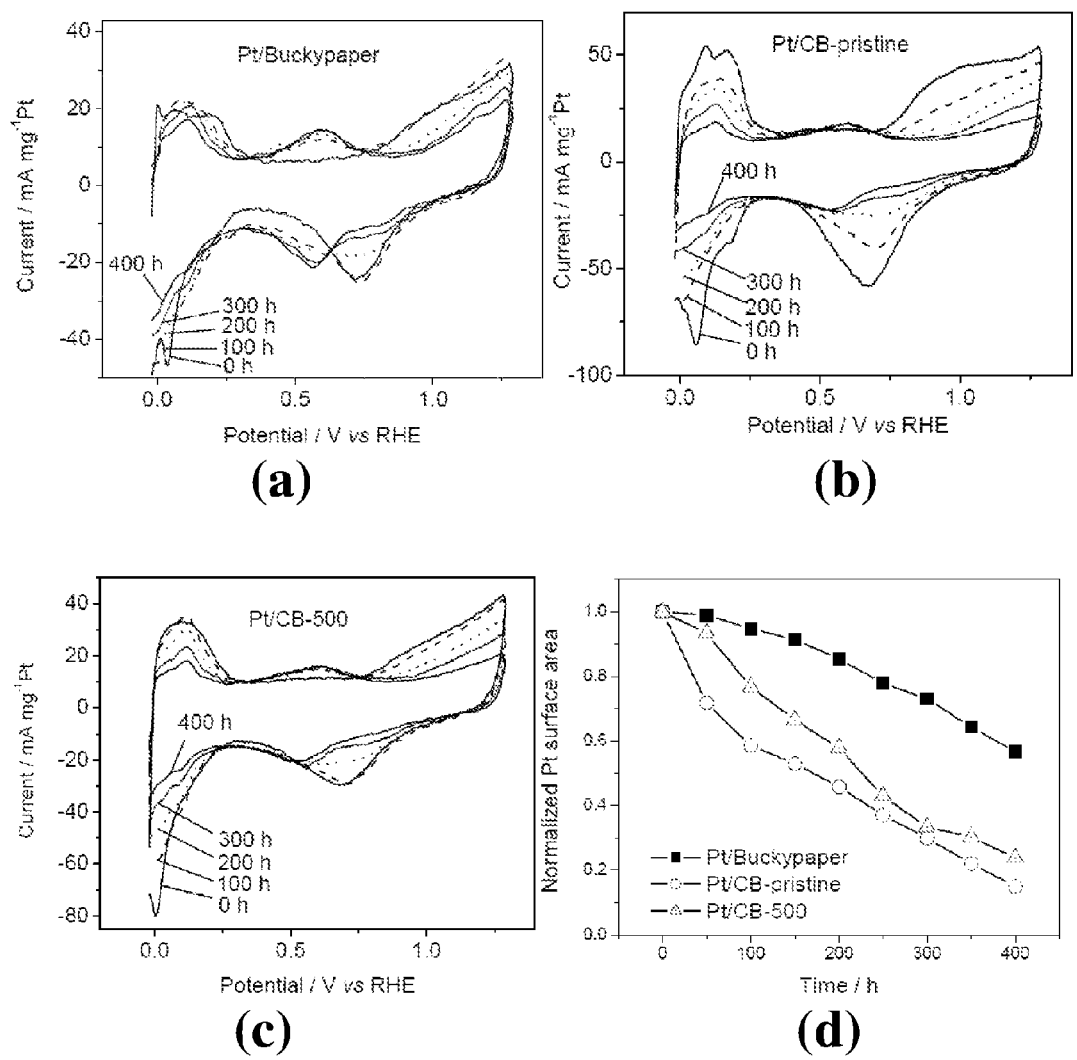
FIG. 11 includes cyclic voltammograms of a) Pt/Buckypaper, b) Pt/CB-pristine, c) Pt/CB-500 at different time intervals during accelerated durability test; d) normalized Pt electrochemical surface area of Pt/Buckypaper, Pt/CB-pristine, and Pt/CB-500 as a function of holding time at 1.2 V, as determined from cyclic voltammetry shown in a), b), and c).

The representative cyclic voltammograms of Pt/BP, Pt/C-pristine, and the Pt/C-500 electrode during ADT are shown in FIGS. 11a, 11b, and 11c, respectively. The electrochemical surface area (ECSA) is an important parameter to characterize the catalytic activity of electrodes. ECSA is determined by integrating the $H_2$-adsorption peak in the hydrogen region (0.05 to 0.4 V) of the voltammograms with the subtraction of the current due to double-layer charging. The ECSA for the Pt/BP was calculated as 40.7 $m^2/g$ before the ADT, while 75.7 $m^2/g$ was calculated for the Pt/C-pristine and 51.8 $m^2/g$ for the Pt/C-500. The smaller ECSA for Pt/BP is due to the relatively large Pt particles deposited on the buckypaper by electrochemical deposition.

FIG. 11d shows the ECSA degradation over time, which is normalized with the initial ECSA value. The Pt/BP catalyst clearly exhibited a much slower degradation rate of ECSA than the other two catalysts. For example, only 15% of the Pt surface area was lost for the Pt/BP after a 200-hour oxidation treatment, while about half of the Pt surface area was lost for the carbon black-supported Pt. After a 400-hour ADT, the Pt/BP still remained at 57% ECSA of the Pt, which was, however, with only 15% and 24% remaining in the Pt/CB-pristine and Pt/CB-500, respectively.

Figure 12:
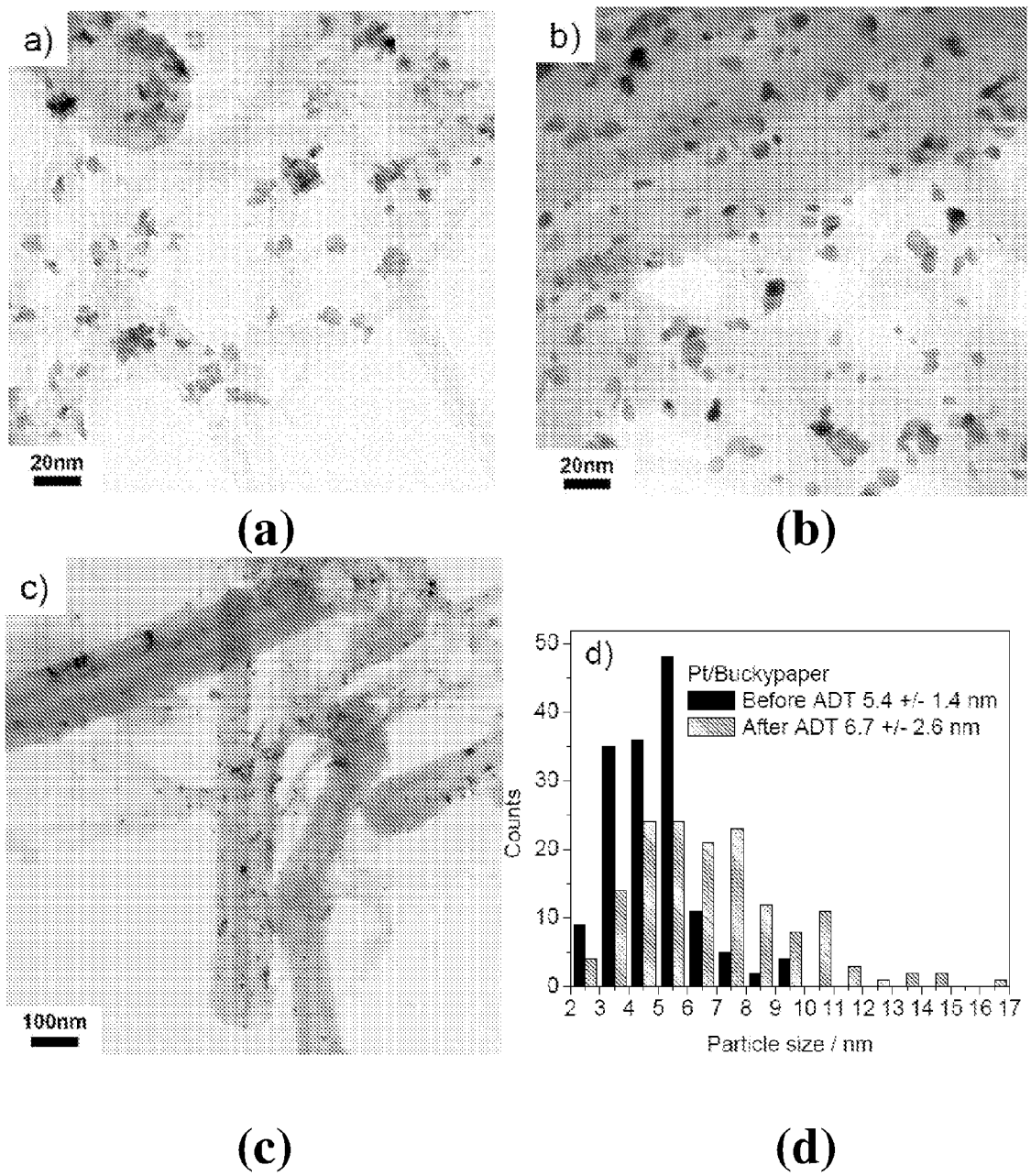
FIG. 12 includes TEM images of Pt/Buckypaper a) before ADT, b) after ADT, and c) after ADT in low magnification; d) Pt size distribution before and after ADT determined from TEM image a) and b), respectively.
Figure 13:
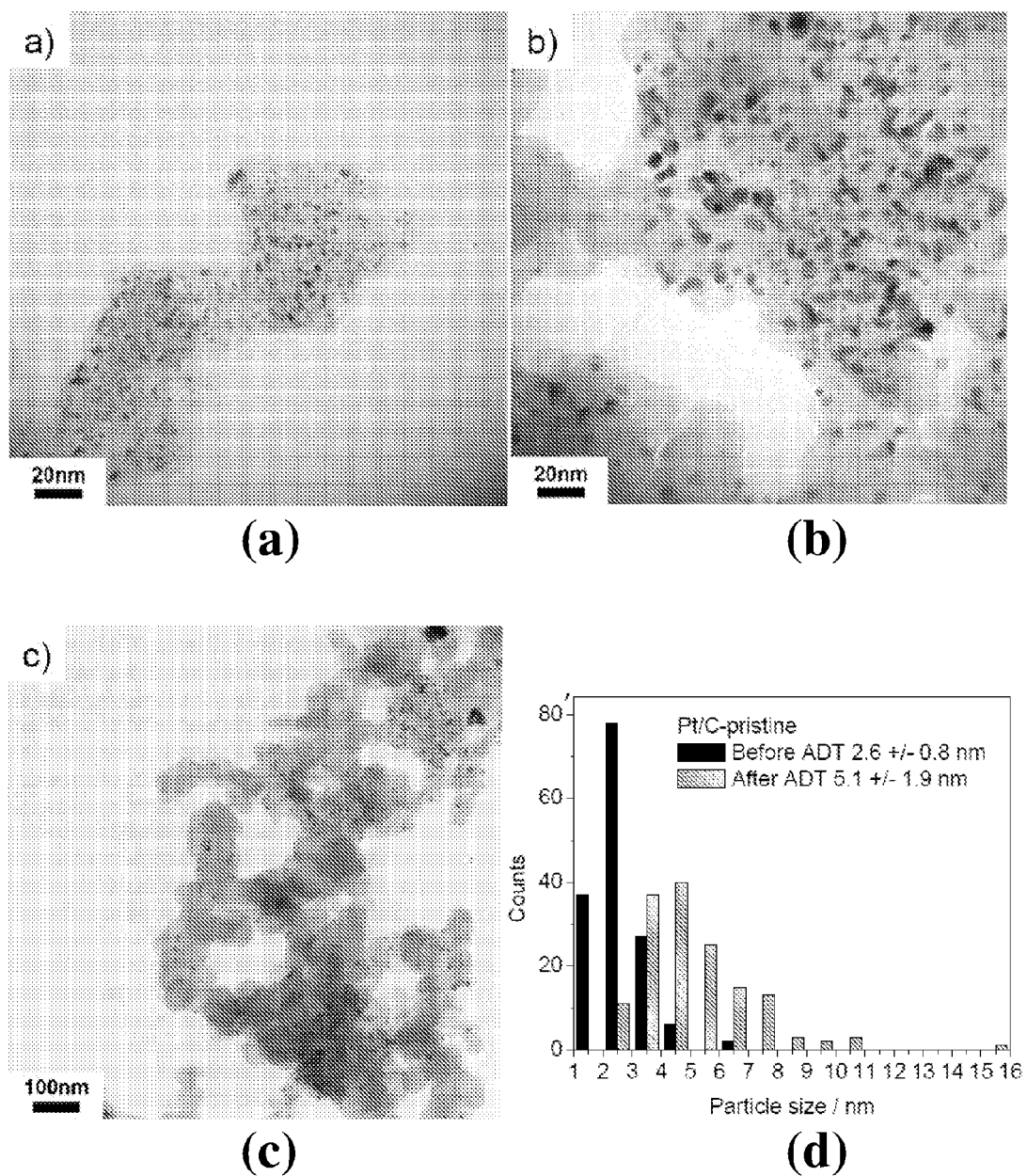
FIG. 13 includes TEM images of Pt/CB-pristine a) before ADT, b) after ADT, and c) after ADT in low magnification; d) Pt size distribution before and after ADT determined from TEM image a) and b), respectively.
Figure 14:
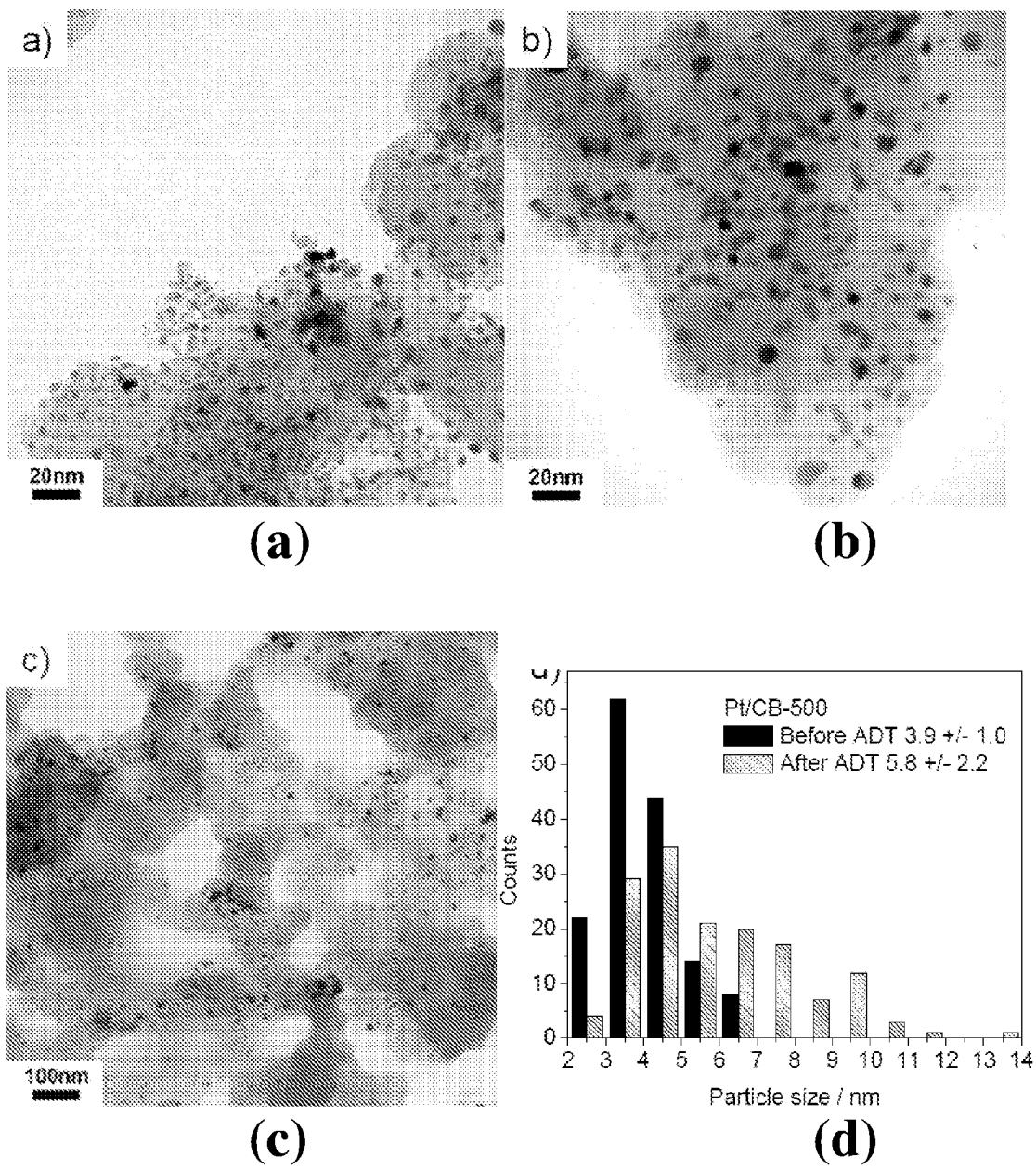
FIG. 14 includes TEM images of Pt/CB-500 a) before ADT, b) after ADT, and c) after ADT in low magnification; d) Pt size distribution before and after ADT determined from TEM image a) and b), respectively.

FIGS. 12a, 12b and 12c (low magnification) show TEM images of the Pt/BP catalysts taken before and after the ADT, while FIGS. 13 and 14 show corresponding images for the Pt/CB-pristine and Pt/CB-500, respectively. The Pt size distributions obtained from the image analysis of 150 randomly selected Pt particles before and after the ADT were shown in FIGS. 12d, 13d, and 14d for the three catalysts. The average Pt particle size in Pt/BP is 5.4 nm which is about two-fold of that in the Pt/CB-pristine and results in a smaller electrochemical surface area as shown in FIGS. 10a and 10b.

It can be seen in FIG. 12a that some Pt nanoparticles agglomerated on the SWNT/CNF surface before the ADT, yet the particle edges are well-defined. It appears that the Pt nanoparticles were stacked together, rather than coalesced in the agglomeration because there is no necking region observed between the particles. After ADT, the stacked Pt particles tended to be sintered together, since the obvious Thus, the loss of the Pt surface area is mainly due to Pt coarsening and the disappearance of Pt from the supports. The Pt loss from the supports could be approximated by comparing the ECSA ($A_E$) measured by the CV and the theoretically calculated chemical surface area of Pt. The chemical surface area ($A_c$) of Pt can be calculated by assuming that all particles are spherical in shape with the following equation:

$$A_c = \frac{\text{surface area}}{\text{mass}} = \frac{\pi D^2}{\frac{1}{6}\pi D^3 \rho} = \frac{6}{\rho D} \quad (4)$$

where D is an average diameter of Pt particles. The average diameter was calculated using the volume/area average diameter ($\overline{D}_{v/a}$), which is defined by the following equation;

$$\overline{D}_{v/a} = \sum_{i=1}^{n} D_i^3 \bigg/ \sum_{i=1}^{n} D_i^2 \quad (5)$$

The relationship between the chemical surface area and the ECSA ($A_E$) before ADT may be described as follows:

$$A_E = \lambda A_c \quad (6)$$

where $\lambda$ is the Pt usage indicating how many surface Pt atoms are active in electrochemical reactions. A portion of Pt was lost from the electrode after the ADT, which no longer contributed to the ECSA. ECSA may be calculated through the following equation if $\lambda$ is considered unchanged;

$$A'_E = (1-k) \cdot \lambda A'_c \quad (7)$$

where k indicates how much Pt is lost, $A'_E$ and $A'_c$ are the ECSA and chemical surface areas obtained after ADT, respectively. Therefore, the Pt loss can be estimated as:

$$k = 1 - A'_E A_c / A_E A'_c = 1 - A'_E \overline{D}'_{v/a} / A_E \overline{D}_{v/a} \quad (8)$$

where $\overline{D}'_{v/a}$ is the volume/area average diameter after the ADT. Table 2 summarizes the calculated results.

| Sample | Electrochemical surface area ($m^2/g$) | | Average diameter (nm) | | Volume/area average diameter (nm) | | Pt loss from substrate |
|---|---|---|---|---|---|---|---|
| | Before ADT | After ADT | Before ADT | After ADT | Before ADT | After ADT | (%) after ADT |
| Pt/BP | 40.7 | 23.1 | 5.4 | 6.7 | 6.1 | 8.8 | 18 (29*) |
| Pt/CB-pristine | 75.7 | 11.3 | 2.6 | 5.1 | 3.2 | 6.7 | 69 (71*) |
| Pt/CB-500 | 51.8 | 12.3 | 3.9 | 5.8 | 4.5 | 7.4 | 61 (65*) |

*In Table 2, the Pt loss from substrate was calculated using Equation 8 where average diameter was adopted.

necked region between the particles can be found in FIG. 12b. The average Pt particle size consequently increased from 5.4 nm to 6.7 nm. In the case of the carbon black-supported Pt catalyst, more severe Pt coarsening occurred after the ADT, e.g. Pt size increased from 2.6 nm to 5.1 nm for the Pt/C-pristine and from 3.9 nm to 5.8 nm for the Pt/C-500. The necked Pt particles could also be easily observed in the Pt/C-pristine (FIG. 13c) and Pt/C-500 (FIG. 14c) catalyst after the ADT.

The Pt losses from substrates after ADT were calculated as 18% for Pt/BP, 69% for Pt/CB-pristine, and 61% for Pt/CB-500. It was estimated that 41% ECSA loss in Pt/BP was attributed to the Pt loss from substrates which resulted in approximately 80% ECSA loss in carbon black supported Pt. The remaining parts of ECSA losses due to Pt coarsening were respectively 59% for Pt/BP, 20% for Pt/CB-pristine, and Pt/CB-500. Pt loss from substrates is therefore the major reason for Pt ECSA loss.

Only 18% of Pt was lost from the buckypaper after a 400-hour oxidation experiment, while about two-thirds of the Pt disappeared from the carbon black supports. This substantial loss of Pt could be visually observed from the TEM images (FIGS. 13c and 14c). The Pt particle distribution was extremely uneven, specifically, a large number of carbon black particles with few Pt particles can be found in those images. It is reasonable to believe that the low ECSA degradation rate of Pt/BP is due to not only the mild Pt coarsening but also the difficulty to lose Pt from buckypaper supports. Pt is assumed to be lost from the supports because of Pt dissolution in the electrolyte and Pt detachment from the supports.

Darling et al. showed that the Pt dissolution is negligible at both low (0.87 V) and high (1.2 V) potentials, but is significant at intermediate potentials, (1.05 V) or with potential cycling. See R. M. Darling and J. P. Meyers, *J. Electrochem. Soc.*, 152, A242 (2005); R. M. Darling and J. P. Meyers, *J. Electrochem. Soc.*, 150, A1523 (2003). The modeling and experimental data reported by Darling et al. indicated that, at lower potentials, the solubility of Pt in acid was quite low, while at higher potentials, the platinum oxide on the Pt surface with high coverage insulated the particle and protected it from dissolution. In contrast, in the experiments disclosed herein there is not much difference of Pt loss from substrate observed between the pristine Pt/C and heat-treated Pt/C, although the Pt particle size increased from 2.6 nm to 3.9 nm after a heat treatment at 500° C. for 3 hours in hydrogen. The difference should be significant if the Pt dissolution mainly contributes to Pt loss, since the Pt dissolution rate is strongly dependent on particle size, according to theoretical modeling for size effects on Pt dissolution.

Figure 15:
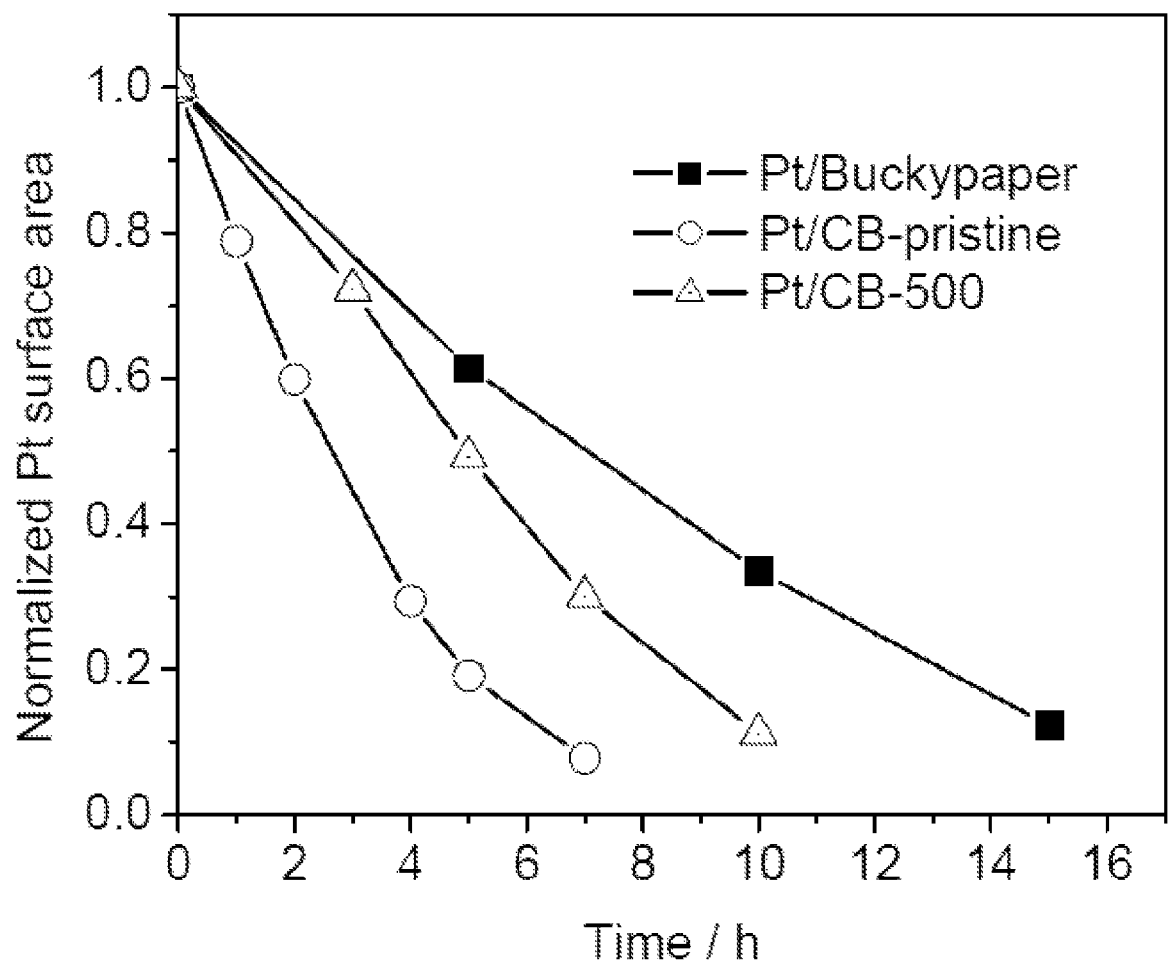
FIG. 15 is the normalized Pt electrochemical surface areas of Pt/Buckypaper, Pt/CB-pristine, and Pt/CB-500 as a function of duration time of ADT under square-wave potential cycles between 0.85 V for 15 s and 1.4 V for 45 s.

The strong dependence of Pt dissolution rate on size was also observed in the ADT under potential cycling with a very high upper potential (1.4 V) (FIG. 15) in our experiments. Under this condition, the Pt dissolution was greatly enhanced and became dominant in all mechanisms of the Pt surface area loss. The rate of Pt loss decreased one-third for the Pt/C after the heat treatment because of the increase of particle size, which is still 1.5 times faster than that for the Pt/BP. Considering the comparable rate of Pt loss for Pt/C-pristine and Pt/C-500 in the first durability test, it can be concluded that Pt dissolution cannot account for most of the Pt loss. Therefore, it is believed that the much lower rate of Pt loss in Pt/BP is mainly due to lower rates of platinum detachment from the buckypaper support.

The detachment of Pt particles from catalyst support is generally induced by carbon corrosion, since the reduction of carbon content by corrosion may weaken the interaction between the Pt and carbon support. As previously discussed, the buckypaper unexpectedly showed higher corrosion resistance, compared to the carbon black due to the higher graphitization degree, which is believed to have resulted in stronger Pt-support interaction and a smaller reduction of carbon during corrosion. This appears to be the mechanism explaining the unexpectedly reduced occurrence of Pt particle detachment from the buckypaper support compared to other Pt/C approached.

Figure 16:
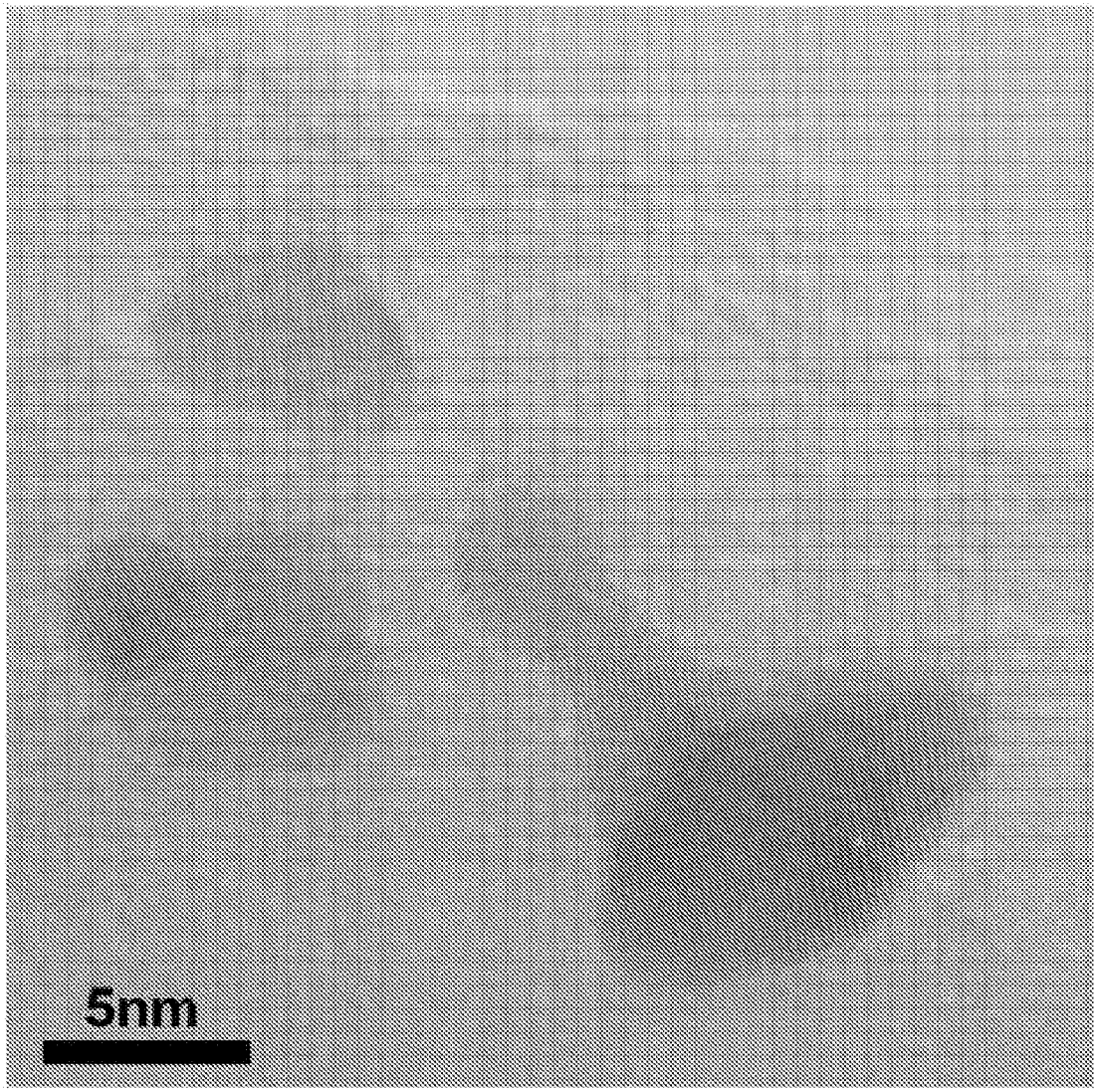
FIG. 16 is a high-resolution TEM image of Pt/Buckypaper after accelerated durability test under a constant potential of 1.2V.

Platinum coarsening was another major reason for Pt surface area loss in the Pt/buckypaper. FIG. 12b shows that a great deal of large Pt particles formed a necked region after the ADT. The high-resolution TEM (HRTEM) image (FIG. 16) clearly shows that the necked region was formed by the combination of several individual crystals of platinum. Due to the low Pt dissolution rate at 1.2 V, the Pt coarsening appears mainly due to the Pt coalescence, rather than Pt ripening. By taking advantage of the high graphitization degree of buckypaper, a slower Pt coarsening rate is expected in the Pt/BP. For the Pt/C catalyst, the corrosion of carbon black support may facilitate crystal migration, resulting in the coalescence of Pt nanoparticles, which could be found in FIGS. 13b and 14b.

Although the Pt particles in the Pt/BP composite are relatively large, excellent cell performance and Pt utilization were achieved by using Pt/BP as a cathode layer due to the unique microstructure of Pt/buckypaper. In the Pt/buckypaper composite, Pt particles are located on the external surface of the carbon nanotube/nanofiber network, which ensures that the catalyst particles occupy the most efficient contact zones for the electronic and electrolytic pathways. Most of the Pt surface would be the catalytic activation sites for ORR, resulting in a very high Pt utilization. The electrochemical surface area of Pt measured in a single cell for Pt/BP is comparable to that of Pt/C despite the fact Pt particle size in Pt/BP composites is two times larger than that of Pt/C due to the high Pt utilization in BP. Just as importantly, the high porosity of buckypaper also benefits the mass transfer process within the catalyst layer, resulting in further improvement for cell performance. The durability of Pt/composite BP in a single cell has been tested at 95° C. by holding cell potential at 1.2 V with $N_2$ feeding into the cathode. The results showed a much slower ECSA loss rate for Pt/BP compared to the Pt/CB. For example, there is a 50% ECSA loss for the Pt/BP cathode after 100-hour operation compared to a 60% ECSA loss for Pt/C after 30 hours.

The foregoing description of preferred embodiments of the invention has been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A membrane electrode assembly (MEA) for a fuel cell, comprising
    a proton exchange membrane; and
    a catalyst layer comprising a plurality of catalyst nanoparticles disposed on buckypaper, said buckypaper comprising a mixture of (a) at least one of single-wall nanotubes and small diameter multi-wall carbon nanotubes and (b) carbon nanofibers, wherein the ratio of (a) to (b) ranges from 1:2 to 1:20, and wherein a surface area utilization efficiency of said plurality of catalyst nanoparticles is at least 70%.

2. The membrane electrode assembly according to claim 1, wherein said buckypaper comprises at least a first and a second layer.

3. The membrane electrode assembly according to claim 2, wherein said first and second layers are different; and
    said second layer comprises: multi-wall nanotubes, carbon nanofibers, or both.

4. The membrane electrode assembly according to claim 3, further comprising a gas diffusion layer associated with said catalyst layer, wherein said gas diffusion layer comprises said second layer of said buckypaper.

5. The membrane electrode assembly according to claim 1, wherein said catalyst layer is formed by depositing said plurality of catalyst nanoparticles on said buckypaper after said buckypaper has been formed.

6. The membrane electrode assembly according to claim 1, wherein said catalyst layer comprising 1% or less binder following deposition of the catalyst nanoparticles.

7. The membrane electrode assembly according to claim 1, wherein said catalyst nanoparticles comprise platinum.

8. The membrane electrode assembly according to claim 7, wherein a catalyst utilization efficiency of said plurality of platinum comprising nanoparticles is 0.50 $g_{Pt}$/kW or less.

9. The membrane electrode assembly according to claim 1, wherein said catalyst layer is a cathode catalyst layer.

10. A method of fabricating a membrane electrode assembly for a fuel cell according to claim 1, the method comprising:
producing the catalyst layer, said producing step comprising:
forming the buckypaper, said forming step, comprising dispersing the mixture in a liquid and removing the liquid; and
depositing the catalyst nanoparticles on said buckypaper, wherein said buckypaper comprises binder in an amount of 1 wt-% or less following said forming step.

11. The method according to claim 10, wherein said forming step occurs before said depositing step.

12. The method according to claim 10, wherein said catalyst nanoparticles are deposited by a technique selected from the group consisting of electrochemical deposition, sputtering deposition, and supercritical deposition.

13. The method according to claim 10, further comprising:
producing a gas diffusion layer (GDL) associated with said catalyst layer, said producing a GDL step comprising:
forming a GDL buckypaper layer, said forming a GDL buckypaper layer step, comprising dispersing a plurality of nanomaterials in a liquid, and removing the liquid, wherein said nanomaterials comprise materials selected from the group consisting of large diameter multi-wall nanotubes, carbon nanofibers, and combinations thereof.

14. The method according to claim 10, wherein said GDL buckypaper layer is formed on said buckypaper; or
wherein said buckypaper is formed on said GDL buckypaper layer.

* * * * *